(12) United States Patent
Prater et al.

(10) Patent No.: US 12,709,675 B2
(45) Date of Patent: Aug. 18, 2026

(54) FLAME-RETARDANT ABRASION-RESISTANT CONVEYOR BELT

(71) Applicant: ContiTech Deutschland GmbH, Hannover (DE)

(72) Inventors: Grant Prater, Bexley, OH (US); Kevin Xie, Marysville, OH (US)

( * ) Notice: Subject to any disclaimer, the term of this patent is extended or adjusted under 35 U.S.C. 154(b) by 126 days.

(21) Appl. No.: 18/932,026

(22) Filed: Oct. 30, 2024

(65) Prior Publication Data

US 2026/0117052 A1 Apr. 30, 2026

(51) Int. Cl.
*C08L 9/00* (2006.01)
*B65G 15/36* (2006.01)
(Continued)

(52) U.S. Cl.
CPC ................ *C08L 9/00* (2013.01); *B65G 15/36* (2013.01); *C08K 3/04* (2013.01); *C08K 3/042* (2017.05);
(Continued)

(58) Field of Classification Search
CPC ........ C08K 2201/005; C08K 2201/006; C08K 3/22; C08K 11/00; C08K 13/00; C08K 2003/265; C08K 2201/001; C08K 3/04; C08K 3/042; C08K 3/346; C08K 5/14; C08K 5/521; B32B 15/06; B32B 2262/0261; B32B 2262/0276; B32B 2264/102; B32B 2264/108; B32B 2270/00; B32B 2307/3065; B32B 2307/54; B32B 2433/02; B32B 25/02; B32B 25/10; B32B 25/12; B32B 25/14; B65G 15/38; C01B 33/22; C01P 2004/51; C01P 2006/12; C01P 2006/60; C01P 2006/62; C01P 2006/63; C01P 2006/64; C08L 2666/08; C08L 7/00; C08L 9/00; C08L 9/06; C09C 1/3018;
(Continued)

(56) References Cited

U.S. PATENT DOCUMENTS

2010/0044189 A1* 2/2010 Alexander .............. B32B 25/12
198/846

FOREIGN PATENT DOCUMENTS

| | | |
|---|---|---|
| CN | 101585934 B | 5/2011 |
| CN | 106832556 A | 6/2017 |
| WO | 2013102208 A1 | 7/2013 |

* cited by examiner

*Primary Examiner* — Gene O Crawford
*Assistant Examiner* — Amari J Meddling
(74) *Attorney, Agent, or Firm* — Iken S. Sans; Richard A. Wolf; Gregory Admas

(57) ABSTRACT

An article such as a conveyor belt includes an elastomeric composition containing a unique flame-retardant system that includes intumescent graphite along with other flame retardant(s) that cooperate in synergist effect to achieve certain flame resistance criteria while also providing suitable abrasion resistance. The flame retardants of the system may include halogenated compound(s) from 5 phr to 25 phr, antimony trioxide compound(s) from 1 phr to 15 phr, alumina trihydrate compound(s) from 2 phr to 25 phr, and intumescent graphite(s) from 1 phr to 10 phr. The flame retardants may cooperate in synergistic effect such that the cured elastomeric compound has (i) an afterglow value of less than 100 seconds in accordance with testing under ASTM D378 13.2 as associated with flame resistance; and (ii) a non-rotating DIN abrasion value of less than 150 $mm^3$ according to DIN 53516, Method A as associated with abrasion resistance.

15 Claims, 1 Drawing Sheet

(51) Int. Cl.
*C08K 3/04* (2006.01)
*C08K 3/22* (2006.01)
*C08K 5/06* (2006.01)

(52) U.S. Cl.
CPC .................. *C08K 3/22* (2013.01); *C08K 5/06* (2013.01); *B65G 2207/22* (2013.01); *C08K 2003/2227* (2013.01); *C08K 3/2279* (2013.01); *C08L 2201/02* (2013.01)

(58) Field of Classification Search
CPC ....... Y10T 428/3183; F16G 1/10; F16G 1/28; F16G 5/08; F16G 5/20
See application file for complete search history.

FLAME-RETARDANT ABRASION-RESISTANT CONVEYOR BELT

TECHNICAL FIELD

The present disclosure relates generally to an elastomeric article having flame resistance and/or abrasion resistance, and more particularly to a flame-retardant and abrasion-resistant conveyor belt.

BACKGROUND

Heavy-duty conveyor belts are commonly used for transporting products and material. The conveyor belts so employed may be long, for example, on the order of miles, and represent a high-cost component of an industrial material handling operation. Such conveyor belts can be as large as ten feet wide, and possibly as thick as three inches. Typically, such conveyor belts include a top or carry cover layer, a bottom or pulley cover layer, and a reinforcement layer between the top and bottom cover layers. The top and bottom cover layers are typically formed from an elastomeric material. The reinforcement layer may include reinforcing steel cords that are embedded in an elastomeric matrix to form a carcass of the belt. Alternatively, the reinforcing layer may include one or more plies of a textile material.

SUMMARY

Conveyor systems may be used in a variety of severe service environments with exposure to fire risk due to the presence of flammable materials, elevated temperatures, or the like. To mitigate such fire risk, these conveyor belts may be required to adhere to stringent industry standards, such as the ASTM D378 13.2 standard, which is designed to ensure that conveyor belts can withstand exposure to flames and restrict the spread of fire. Conveyor belts that meet such flame standards as ASTM D378 13.2 typically rely on a relatively high amount of conventional flame retardants in the rubber mixture, including one or more of alumina trihydrate (ATH), chlorinated paraffins, brominated materials, antimony trihydroxide, or the like.

At least one problem with the use of such flame retardants and their relatively high levels in the conveyor compound is that these flame retardants are generally non-reinforcing and their presence in the compound typically decreases physical properties, such as abrasion resistance. Because conveyor belts are subjected to constant friction and wear as they transport various materials, there is a need to develop an elastomeric composition for a conveyor belt that satisfies flame resistance criteria while also improving the abrasion resistance properties of the conveyor belt to improve conveyor belt service life.

At least one aspect of the present disclosure solves one or more problems associated with conventional fire-resistant conveyor belts by providing an elastomeric compound that improves abrasion resistance while attaining suitable fire resistance properties, such as satisfying ASTM D378 13.2 specifications.

According to at least one aspect, to improve the abrasion resistance of the conveyor composition, the total amount of conventional flame retardant(s) may be minimized while simultaneously replacing a fractional amount of intumescent graphite (also known as expandable graphite) in the composition to provide a synergist and balanced approach of attaining the desired abrasion resistance along with the desired fire resistance (e.g., according to ASTM D378 13.2).

More particularly, according to an aspect, the exemplary elastomeric compound, with the intumescent graphite being part of the flame-retardant system along with other flame retardant(s), may achieve both (i) an afterglow value of less than 100 seconds in accordance with testing under ASTM D378 13.2 as associated with flame resistance; and (ii) a non-rotating DIN abrasion value of less than 150 $mm^3$ according to DIN 53516, Method A as associated with abrasion resistance.

The exemplary elastomeric compound also may achieve a flameout value of less than 60 seconds in accordance with testing under ASTM D378 13.2 also as associated with flame resistance.

According to an aspect, a conveyor belt includes: a top cover layer, a bottom cover layer, and a reinforcement layer between the top and bottom cover layers, wherein at least the top cover layer includes a cured elastomeric compound formed from a composition including: one or more base elastomer(s); one or more reinforcing agent(s) in a total amount from 30 phr to 80 phr; flame retardants in a total amount from 20 phr to 65 phr; wherein the flame retardants include: one or more halogenated compound(s) in a total amount from 5 phr to 25 phr; one or more antimony trioxide compound(s) in a total amount from 1 phr to 15 phr; one or more alumina trihydrate compound(s) in a total amount from 2 phr to 25 phr; and one or more intumescent graphite(s) in a total amount from 1 phr to 10 phr; wherein the flame retardants cooperate in synergistic effect such that: (i) the cured elastomeric compound has an afterglow value of less than 100 seconds in accordance with testing under ASTM D378 13.2 as associated with flame resistance; and (ii) the cured elastomeric compound has a non-rotating DIN abrasion value from 5 $mm^3$ to 150 $mm^3$ according to DIN 53516, Method A as associated with abrasion resistance.

According to another aspect, a method of improving a conveyor belt, includes: (i) providing a top cover layer, a bottom cover layer, and a reinforcement layer between the top and bottom cover layers to form the conveyor belt, wherein at least the top cover layer includes a cured elastomeric compound formed from a composition comprising: one or more base elastomer(s) and one or more reinforcing agent(s) in a total amount from 30 phr to 80 phr; (ii) improving a combination of both abrasion resistance and flame resistance of the cured elastomeric compound by incorporating a flame-retardant system into the composition, in which the flame-retardant system includes flame retardants in a total amount from 20 phr to 65 phr; wherein the flame retardants include: one or more halogenated compound(s) in a total amount from 5 phr to 25 phr; one or more antimony trioxide compound(s) in a total amount from 1 phr to 15 phr; one or more alumina trihydrate compound(s) in a total amount from 2 phr to 25 phr; and one or more intumescent graphite(s) in a total amount from 1 phr to 10 phr; wherein the improving the combination of both the abrasion resistance and the flame resistance is provided by the flame retardants cooperating in synergistic effect such that: (i) the cured elastomeric compound has an afterglow value of less than 100 seconds in accordance with testing under ASTM D378 13.2 as associated with flame resistance; and (ii) the cured elastomeric compound has a non-rotating DIN abrasion value from 5 $mm^3$ to 150 $mm^3$ according to DIN 53516, Method A as associated with abrasion resistance.

According to another aspect, a conveyor belt includes: a top cover layer, a bottom cover layer, and a reinforcement layer between the top and bottom cover layers, wherein at least the top cover layer includes a cured elastomeric compound formed from a composition including: one or more base elastomer(s), the one or more base elastomers including a mixture of (i) one or more polybutadiene elastomers and (ii) one or more polyisoprene elastomer(s), wherein the base elastomers altogether constitute at least 90 phr of the base elastomers of the elastomeric composition, the one or more polybutadiene elastomers being present in an amount of at least 80 phr and the one or more polyisoprene elastomer(s) being present in an amount of at least 10 phr; one or more reinforcing agent(s) in a total amount from 30 phr to 80 phr, the one or more reinforcing agent(s) consisting of only carbon black(s) which is/are present in total amount from 30 phr to 80 phr; a single flame-retardant system consisting of a plurality of flame retardants present in a total amount from 20 phr to 45 phr, wherein the plurality of flame retardants consist of: one or more halogenated compound(s) in a total amount from 10 phr to 20 phr, the one or more halogenated compound(s) including decabromodiphenyl ethane(s); one or more antimony trioxide compound(s) in a total amount from 1 phr to 5 phr, the one or more antimony trioxide compound(s) having at least 90% $Sb_2O_3$; one or more alumina trihydrate compound(s) in a total amount from 5 phr to 15 phr, the one or more alumina trihydrate compound(s) consisting essentially of 100% alumina trihydrate; and one or more intumescent graphite(s) in a total amount from 3 phr to 5 phr, the one or more intumescent graphite(s) having an expansion ratio in a range from 250:1 to 350:1, and having an average particle size in a range from 200 microns to 400 microns; wherein the flame retardants cooperate in synergistic effect such that: (i) the cured elastomeric compound has an afterglow value of 40 seconds or less in accordance with testing under ASTM D378 13.2 as associated with flame resistance; and (ii) the cured elastomeric compound has a non-rotating DIN abrasion value from 10 $mm^3$ to 30 $mm^3$ according to DIN 53516, Method A as associated with abrasion resistance.

According to another aspect, an article comprising a cured elastomeric body formed from a composition includes: one or more base elastomer(s); one or more reinforcing agent(s); and a single flame-retardant system consisting of a plurality of flame retardants present in a total amount from 20 phr to 65 phr, wherein the flame-retardant system includes intumescent graphite in a total amount from 1 phr to 10 phr; wherein the cured elastomeric body has an afterglow value of less than 100 seconds according to ASTM D378 13.2 as associated with flame resistance; and wherein the cured elastomeric body has a non-rotating DIN abrasion value of less than 150 $mm^3$ according to DIN 53516, Method A as associated with abrasion resistance.

The following description and the annexed drawings set forth certain illustrative embodiments according to the present disclosure. These embodiments are indicative, however, of but a few of the various ways in which the principles of the invention may be employed. Other objects, advantages and novel features according to aspects of the present disclosure will become apparent from the following detailed description when considered in conjunction with the drawings.

BRIEF DESCRIPTION OF THE DRAWINGS

The annexed drawings, which are not necessarily to scale, show various embodiments according to the present disclosure.

DETAILED DESCRIPTION

Figure 1:
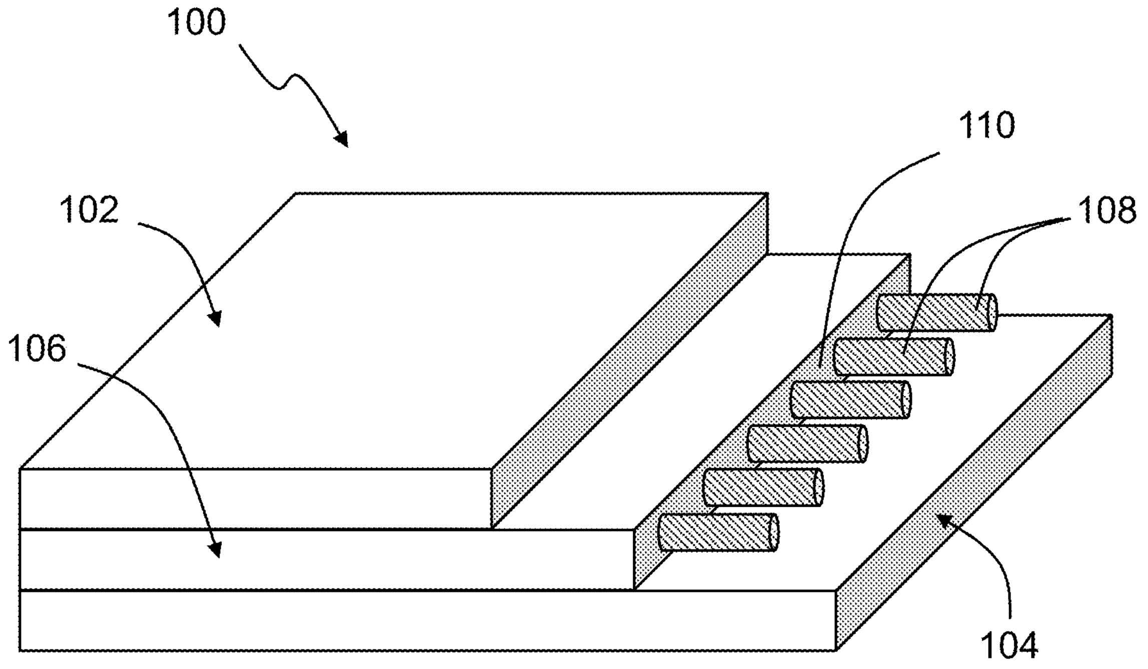
FIG. 1 illustrates a portion of a conveyor belt in a perspective sectional view, in accordance with an embodiment of the present disclosure.

The principles and aspects according to the present disclosure have particular application to conveyor belts, such as for heavy-duty operations, and thus will be described herein mainly in this context. It is understood, however, that the principles and aspects of the present disclosure may be applicable to other types of belts for other applications, or to other elastomeric articles in general, when desirable to provide one or more advantages of the material(s) and/or construction(s) described herein.

Aspect(s) according to the present disclosure provide an elastomeric composition and/or an article construction using such an elastomeric composition, in which the elastomeric composition includes a unique flame-retardant system that includes intumescent graphite along with other flame retardant(s) that cooperate in synergist effect to achieve certain flame resistance criteria while also providing suitable abrasion resistance for the particular application.

Generally, the elastomeric composition having the unique flame-retardant system may be used in a reinforced elastomeric article having an elastomeric body and at least one reinforcement layer attached to or within the elastomeric body. In exemplary embodiments, the unique elastomeric composition with the unique flame-retardant system may have one or more material properties making it particularly suitable for use in an article such as a conveyor belt. As an example, the elastomeric conveyor compound formed from the exemplary composition may have at least an afterglow value of less than 100 seconds in accordance with testing under ASTM D378 13.2 (as associated with flame resistance), and also may have at least a non-rotating DIN abrasion value of less than 150 $mm^3$ according to DIN 53516, Method A (as associated with abrasion resistance).

More particularly, the exemplary composition may have a non-rotating DIN abrasion value of 100 $mm^3$ or less according to DIN 53516, Method A, or even more particularly non-rotating DIN abrasion value of 50 $mm^3$ or less (including all values between the stated values or ranges and subranges between such values).

More particularly, the exemplary composition may have an afterglow of 60 seconds or less, or even more particularly 40 seconds or less in accordance with testing under ASTM D378 13.2 (including all values between the stated values or ranges and subranges between such values). It is noted that ASTM D378 13.2 relates to testing of the conveyor belt assembly itself and not just the composition, and thus "in accordance with testing under" as used herein (or related terminology) means that the same protocols used for testing the conveyor belt assembly were used to test the elastomeric composition itself.

The exemplary elastomeric compound also may achieve a flameout value of less than 60 seconds in accordance with testing under ASTM D378 13.2 (also as associated with flame resistance), more particularly a flameout value of 40 seconds or less (including all values between the stated values or ranges and subranges between such values).

Article Embodiment(s)

Certain article embodiments of the disclosure will hereafter be described with reference to the accompanying drawings, in which like reference numerals denote like elements. It should be understood, however, that the accompanying figures illustrate the various implementations described herein and are not meant to limit the scope of various technologies described herein. In addition, it is understood that various aspects and features of these embodiments may be substituted for one another or used in conjunction with one another where applicable. Furthermore, it is understood that the description of material(s) forming the various parts of one embodiment article may be the same material(s) for the same or similar part in another embodiment article, except as otherwise noted below.

Referring to FIG. 1, a portion of an exemplary conveyor belt 100 is shown in perspective sectional view. The conveyor belt 100 includes a top or carry cover layer 102, a bottom or pulley cover layer 104, and a reinforcement layer 106 between the top cover layer 102 and the bottom cover layer 104. The top cover layer 102 is configured to carry the material being conveyed, and may include a coating layer such as a fabric or abrasion resistant coating that restricts wear. The bottom cover layer 104 is configured to pass over rollers or pulleys in the conveyor system which support the belt 100, and thus at least the bottom cover layer 104 may locally deform to generally match the shape of the roller as it passes thereover. The bottom cover layer 104 also may include a coating layer such as a fabric or abrasion resistant coating. The reinforcement layer 106 may include one or more layers including reinforcing cords 108 that are embedded in an elastomeric body 110 to form a carcass of the belt 100. The reinforcement layer 106 may be adhered to the top and bottom cover layers 102, 104 with a tie or skim layer(s). The reinforcing cords 108 may be made of any suitable material (e.g., steel), may have any suitable thickness, and may be provided in any suitable number to provide a major load carrying capability of the belt 100.

Figure 2:
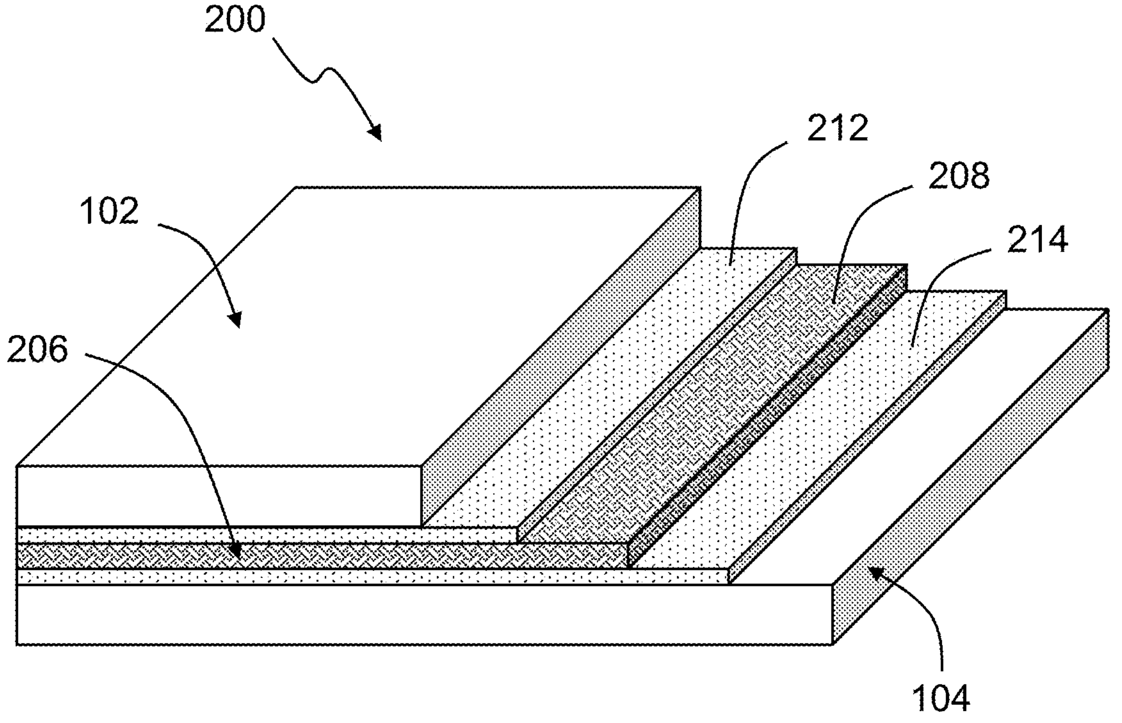
FIG. 2 illustrates a portion of another conveyor belt in a perspective sectional view, in accordance with another embodiment of the present disclosure.

FIG. 2 shows a portion of another exemplary conveyor belt 200, which is constructed substantially similar to the belt 100, except that reinforcement layer 206 of belt 200 includes one or more plies of textile 208 instead of reinforcement cords. In the illustrated embodiment, for example, the textile 208 of reinforcement layer 206 includes at least one fabric which may be formed from materials such as aramid, polyester, nylon, or any other suitable material or any suitable combination thereof. The textile 208 may be attached to the top and bottom cover layers 102, 104 with respective skim layers 212, 214 which coat opposite surfaces of the textile 208 and together form the reinforcement layer 206 or carcass of the belt. Multiple textile layers 208 with skim layer(s) 212 and/or 214 between the textile layers may be utilized as desired to form the reinforcement layer 206. Such a conveyor belt 200 may be assembled initially by applying the skim layers 214, 216 to the opposite surfaces of the textile 208 by a process such as calendaring to form the reinforcement layer 206. Then, the top and bottom cover layers 102, 104 may be simultaneously (or sequentially) applied to the reinforcement layer 206 such as via calendaring. Once assembled, the conveyor belt 200 is vulcanized and may be cut into segments that are attached to each other via suitable splices to achieve the overall desired length of the belt.

Such conveyor belts 100, 200 can vary greatly in size and length. For instance, the conveyor belts used in mining applications can be up to about three meters wide and very long, for example, on the order of many kilometers. The bottom (pulley) cover layer 104 of the conveyor belts may be of any suitable thickness, such as from about 1 mm to about 5 mm. The top (carry) cover layer 102 may have a total thickness of from about 4 mm to about 10 mm, for example. The overall thickness of the belt may be from about 4 mm to about 20 mm.

The top and bottom cover layers 102, 104 of the conveyor belt 100, 200 are formed from a suitable elastomeric material, which this material may be the same for both layers 102, 104, or may be different for each layer. The elastomeric body 110 and skim layers 212, 214 of the belt 100, 200 also may be the same or different from each other, and/or may be the same or different from one or more of the top and bottom cover layers 102, 104. When adjacent layers are formed from the same material, they may be attached to each other or may form a continuous unitary structure. When adjacent layers are made from different materials, they generally are formed from materials that are compatible with each other to promote suitable attachment to each other.

According to exemplary embodiment(s) of the present disclosure, the exemplary elastomeric composition having the unique flame-retardant system that includes intumescent graphite along with other flame retardant(s) cooperating to provide suitable flame resistance with suitable abrasion resistance may form at least part or all of any or all of these layers of a conveyor belt, including for example, the top cover layer 102, the bottom cover layer 104, the carcass body 110, the skim layers 212 and/or 214, etc. In exemplary embodiments, at least the top cover layer 102 is formed from the exemplary elastomeric composition with the unique flame-retardant system to thereby improve abrasion resistance with suitable flame resistance. In some embodiments, only the top cover layer 102 of the conveyor belt is formed with this exemplary elastomeric composition, such as to reduce overall cost or other factors. It is of course understood that the carcass body 110 and/or the bottom cover layer 104 also may be formed with the exemplary elastomeric composition.

The details of the exemplary elastomeric composition having the unique flame-retardant system will be further described hereinbelow according to embodiment(s) of the present disclosure.

Elastomeric Composition

The exemplary elastomeric composition includes at least one base elastomer and a flame-retardant system (also referred to as a flame-resistance package) that includes intumescent graphite along with other flame retardant(s). The exemplary composition also may contain one or more of the following additional ingredients: one or more reinforcing agent(s), one or more plasticizer(s), one or more processing aid(s), one or more antidegradant(s), one or more activator (s), one or more vulcanizing agent(s), one or more accelerator(s), one or more retarder(s), and optionally further suitable ingredient(s) to achieve desired characteristic(s). Such ingredients of the exemplary elastomeric composition will be described in further detail below for sake of clarity and not limitation, it being understood that certain embodiments may provide different suitable combinations of these ingredient types and/or amounts, may include one or more additional ingredients or alternative equivalent ingredients in any suitable combination, or may eliminate one or more of these ingredients in any suitable combination, as would be understood by those having ordinary skill in the art in view of the teachings provided herein. It also is understood that the exemplary composition may be vulcanized (cured) to form a cured elastomeric compound that forms at least part of the desired article by using suitable vulcanization techniques, as would be understood by those having ordinary skill in the art.

Base Elastomer(s)

The one or more elastomer(s) of the composition form at least part of the matrix and serve as the base of the elastomeric composition. As such, these elastomer(s) are referred to herein as base elastomer(s) or matrix elastomer(s) which are crosslinked in the vulcanization process to form the matrix of the compound. The composition also may contain other polymer(s), such as non-elastomer polymer(s), that are blended with the base elastomer(s) to also form part of the matrix of the composition. The total polymer content forming the base composition (including mixtures of base polymers) is set at 100 phr. The polymer matrix of the elastomeric composition generally will be formed from a majority of elastomer material(s) as opposed to other types of non-elastomer base polymer(s) to provide elastic properties, for example at least 80%, or at least 90% or more elastomer material(s) forming the polymer matrix. The additives in the composition are compounded relative to the total base polymer content of the composition, and as such may be represented in parts per hundred (phr), which means parts by weight per 100 parts by weight of the base polymer(s).

For elastomeric articles, in general, example base polymer(s) may include natural rubber (NR), epoxidized natural rubber (ENR), polybutadiene elastomer (BR), acrylonitrile butadiene elastomer (NBR), carboxylated nitrile elastomer (XNBR), (partially) hydrogenated nitrile elastomer (HNBR), styrene butadiene elastomer (SBR), carboxylated styrene-butadiene elastomer (XSBR), styrene/ethylene-butylene/styrene-based elastomer (SEBS), ethylene propylene monomer elastomer (EPM), ethylene propylene diene monomer elastomer (EPDM), chloroprene elastomer (CR), isoprene elastomer (IR), butyl elastomer (IIR), bromobutyl elastomer (BIIR), chlorobutyl elastomer (CIIR), chlorinated polyethylene elastomer (CPE), chlorosulfonated polyethylene elastomer (CSM), alkylated chlorosulfonated polyethylene elastomer (ACSM), polyepichlorohydrin elastomers (CO; ECO; ETER), ethylene-vinyl acetate elastomer (EVA), acrylate elastomer (ACM), ethylene-acrylate elastomer (AEM), silicone elastomer (MQ, VMQ, PVMQ, FVMQ), fluorine elastomer (FKM), fluorinated methylsilicone elastomer (MFQ), perfluorinated propylene elastomer (FFPM), perfluorocarbon elastomer (FFKM), thermoplastic elastomers (TPE), thermoplastic vulcanizates (TPV), thermoplastic polyurethanes (TPU), polyolefin elastomers (POE), polyvinylchloride (PVC), and/or polyurethane (PU), or the like, or blends thereof.

In exemplary embodiments, the elastomeric composition includes at least one polybutadiene elastomer (also referred to as butadiene rubber, or BR). Polybutadiene elastomer is a synthetic rubber that is derived from the polymerization of butadiene monomer. The polybutadiene elastomer is a resilient material with a low glass transition (Tg) (e.g., −90° C. to −105° C.) and provides good dynamic performance and abrasion resistance. This makes the polybutadiene elastomer particularly suitable for use in a conveyor belt cover layer compound, and more particularly the top cover layer of the conveyor belt.

The polybutadiene elastomer(s) may be present in the composition in any suitable amount. For example, the total amount of polybutadiene elastomer(s) present in the composition may be in a range from about 30 phr to about 95 phr, more particularly from about 50 phr to about 90 phr (including all values between the stated values or ranges and subranges between such values). In exemplary embodiments, the polybutadiene elastomer(s) constitute a majority of the total base elastomer content (e.g., greater than 50 phr), and more particularly a relatively large majority (e.g., greater than 75 phr or greater than 80 phr, such as between 80 to 90 phr). Suitable polybutadiene elastomer(s) may be high-cis type with a high proportion of cis-1,4-polybutadiene in its structure (e.g., greater than 95%).

The elastomeric composition may further include one or more polyisoprene rubber(s), which may include natural rubber(s) (NR) or synthetic polyisoprene elastomer(s) (IR) to provide a balance of flexibility, improve processability, and improve tear/cut strength. Natural rubber is derived from plant-based material (e.g., rubber tree, dandelion, or other latex producing plant). Synthetic polyisoprene elastomer(s) (IR) are a synthetic form of natural rubber formed from the polymerization of isoprene monomers and designed to mimic the structure and properties of natural rubber, offering similar elasticity and resilience. Suitable polyisoprene elastomer(s) may be high-cis type (e.g., greater than 95%), for example.

The polyisoprene elastomer(s) may be present in the elastomeric composition in any suitable amount, such as in a range from about 5 phr to about 70 phr, more particularly from about 10 phr to about 30 phr (including all values between the stated values or ranges and subranges between such values). In exemplary embodiments, the polyisoprene elastomer(s) constitute a minority of the total base elastomer content (e.g., less than 50 phr), and more particularly a relatively small minority (e.g., less than 25 phr or less than 20 phr, such as between 10 to 20 phr).

A mass (phr) ratio of the one or more polybutadiene elastomer(s) to the one or more polyisoprene elastomer(s) may be in a range from about 30:70 to about 90:10, more particularly from about 60:40 to about 90:10, even more particularly from about 70:30 to 90:10 (including all values between the stated values or ranges and subranges between such values), such as about 75:25, 80:20, 85:15, or 90:10.

The use of other elastomer(s), such as one or more styrene butadiene elastomer(s) (SBR), also is possible for use in the elastomeric composition. The SBR(s) may provide good abrasion resistance and aging resistance for the conveyor compound. The SBR could constitute a complete 1:1 replacement for the polyisoprene elastomer(s) or could replace a fraction of the polyisoprene elastomer(s). However, in exemplary embodiments, the elastomeric compound forming the conveyor belt layer may be devoid of SBR, and/or may be devoid of other elastomers or polymers, such as ethylene propylene diene monomer (EPDM) elastomer, ethylene vinyl acetate elastomer (EVM), nitrile butadiene elastomer (NBR), chlorinated polyethylene (CPE), or the like. This is because in exemplary embodiments a desirable flame resistance criterion (such as afterglow) and abrasion resistance criterion (such as non-rotating DIN abrasion) was found using a mixture of only polybutadiene elastomer(s) and polyisoprene elastomer(s) (e.g., NR) within the above-mentioned ratio(s). As such, in certain embodiments, the base elastomer(s) of the elastomeric composition may consist of only the one or more polybutadiene elastomers (e.g., 100 phr BR), or a blend of only (i) the one or more polybutadiene elastomers and (ii) the one or more polyisoprene elastomer(s) (e.g., natural rubber(s) and/or synthetic polyisoprene elastomer(s)), which together can form 100 phr of the elastomeric composition.

Flame-Retardant System

The flame-retardant system of the elastomeric composition includes one or more intumescent graphite(s) (IG) along with one or more other flame retardant(s) which may be of any suitable type(s) in any suitable amount(s) as may be desired for the application. For example, the other flame retardant(s) (other than intumescent graphite) may include one or more of: halogenated flame retardants (e.g., chlorinated paraffins, decabromodiphenyl ether (DecaBDE), hexabromocyclododecane (HBCD), tetrabromobisphenol A (TBBPA), etc.); inorganic flame retardants (e.g., aluminum hydroxide (ATH), magnesium hydroxide (MDH), antimony trioxide, zinc borate, etc.); phosphorus-based flame retardants (e.g., resorcinol bis (diphenyl phosphate) (RDP), triphenyl phosphate (TPP), triaryl phosphate esters, organic phosphonates, etc.); other intumescent flame retardants (e.g., polyphosphoric acid salts like ammonium polyphosphate (APP), pentaerythritol, dipentaerythritol, etc.); or the like.

Because it was found that many flame retardants of the types described above may be relatively non-reinforcing materials and/or result in poor abrasion resistance when incorporated into a rubber mixture, certain embodiments limit the total amount of all flame retardants in the elastomeric composition (including intumescent graphite and the other flame retardant(s)) to a total amount of about 65 phr or less. Such reduction may enable the cured compound formed from the elastomeric composition to achieve a desired abrasion resistance level (e.g., non-rotating DIN abrasion value of less than 150 $mm^3$ according to DIN 53516, Method A; more particularly 100 $mm^3$ or less; more particularly 50 $mm^3$ or less; such as from 5 $mm^3$ to 150 $mm^3$ including all values between the stated values or ranges and subranges between such values). This reduction of total flame retardants, however, should be balanced with enough flame retardants to achieve the desire flame resistance criteria (e.g., afterglow of less than less than 100 seconds in accordance with testing under ASTM D378 13.2; more particularly 60 seconds or less; more particularly 40 seconds or less; such as from 0 seconds or 1 second to 100 seconds including all values between the stated values or ranges and subranges between such values). The desired flame resistance criteria to be balanced also may include a flameout value of less than 60 seconds in accordance with testing under ASTM D378 13.2, more particularly a flameout value of 40 seconds or less (such as from 0 seconds or 1 second to 60 seconds, including all values between the stated values or ranges and subranges between such values). Accordingly, in certain embodiment(s), the total amount of all flame retardants in the elastomeric composition (including intumescent graphite and the other flame retardant(s)) is in a range from about 20 phr to about 65 phr (including all values between the stated values or ranges and subranges between such values).

As described in further detail below, it was unexpectedly found that a combination of certain flame retardants with the inclusion of intumescent graphite(s) provided a synergistic effect that significantly boosted the flame resistance properties of the elastomeric composition while not significantly reducing abrasion resistance. This is despite intumescent graphite(s) being one of the less reinforcing materials amongst the flame retardants, including an expected Mohs hardness of about 1 to 2, which would have been expected to reduce the abrasion resistance of the compound. Instead, the incorporation of the intumescent graphite(s) was found to break the inherent trade-off between flame resistance and abrasion resistance seen with the combination of the other (non-intumescent graphite) flame retardants. As such, the synergistic effect of the intumescent graphite(s) with the remaining flame retardants was found by achieving both suitable flame resistance and suitable abrasion resistance, in which this synergistic effect exceeds what could be achieved by the combination of the other (non-intumescent graphite) flame retardants alone.

In exemplary embodiments, the incorporation of intumescent graphite(s) with the other flame retardants enables an even lower total loading of all flame retardants in the composition, such as in a range from about 20 phr to 50 phr, more particularly from about 20 phr to about 40 phr (including all values between the stated values or ranges and subranges between such values).

Exemplary flame retardants and their effective amounts that have been found to provide a suitable balance of flame resistance and abrasion resistance according to exemplary embodiment(s) are described in further detail below.

In certain embodiments, the elastomeric composition contains one or more halogenated compound(s) serving as a flame retardant (also referred to as a halogenated flame retardant). As used herein, a halogenated compound (or halogenated flame retardant) is a compound containing greater than 45 percent by weight of halogen(s) based upon total compound weight. In exemplary embodiments, the halogenated flame retardant(s) contain greater than 50 percent by weight, more particularly greater than 70 percent by weight of halogen(s), or even more particularly greater than 80 wt. % halogen(s), with higher halogen contents generally providing improved flame resistance. Such halogenated flame retardant(s) generally work by decomposing when exposed to heat, releasing halogen radicals. These halogen radicals interfere with the combustion process, reducing the formation of flammable gases.

Suitable types of such halogenated flame retardant(s) may include those types described above, such as decabromodiphenyl ethane (DecaBDE), other brominated solids, or chlorinated paraffins, for example. In exemplary embodiment(s), the halogenated flame retardant(s) include one or more types of decabromodiphenyl ethane (DecaBDE). The DecaBDE may have a bromine content of greater than about 80 wt. % with carbon, hydrogen and oxygen as part of the remaining molecular structure. The decomposition or activation temperature of DecaBDE is typically in the range of 300-330° C. (572-626° F.). At these temperatures, DecaBDE begins to break down and release bromine, which helps to inhibit the spread of fire by slowing down the oxidation reactions involved in combustion. In some embodiments, the elastomeric composition may limit the amount of chlorinated compounds (e.g., less than 20 phr), or may be devoid of chlorinated compounds (e.g., chlorinated paraffins) as these may create mold fouling on platen presses when forming the cured composition.

The halogenated flame retardant(s) (e.g., DecaBDE) may be present in the elastomeric composition in a total amount from about 5 phr to about 25 phr, more particularly from about 10 phr to about 20 phr (including all values between the stated values or ranges and subranges between such values). At amounts of above 25 phr halogent flame retardant(s), it is understood that the effect may become saturated and/or reduce abrasion resistance, and at amounts below about 5 phr it is understood that the effect may make flame resistance unsuitable.

Alternatively or additionally to the halogenated flame retardant(s), the elastomeric composition may include one or more antimony trioxide compound(s) serving as a flame retardant (also referred to as an antimony trioxide flame retardant). As used herein, an antimony trioxide compound (or antimony trioxide flame retardant) is a compound containing greater than 50 percent by weight of antimony trioxide based upon total compound weight. In exemplary embodiments, the antimony trioxide flame retardant(s) contain greater than 70 percent by weight of antimony trioxide, or even more particularly greater than 80 wt. % antimony trioxide, such as about 90 wt. % antimony trioxide. Such antimony trioxide-based flame-retardant compound(s) also may include other compounds, such as chlorinated paraffin (e.g., liquid, polymeric or solid chlorinated paraffin) or other binder which may act as a carrier and/or help synergistic flame-retardant performance when combined with antimony trioxide. These antimony trioxide flame retardant(s) generally work by acting as a synergist with halogenated flame retardants. At a temperature of about 300° C. to 360° C. (572° F. to 680° F.), the antimony trioxide in the flame retardant may reacts with halogenated compounds to form volatile antimony halides (e.g., antimony bromide or antimony chloride). These compounds act in the gas phase to interfere with the combustion process. The antimony trioxide may promote the formation of a protective char layer which insulates the material and slows down further burning by reducing heat transfer to unburnt material.

The antimony trioxide flame retardant(s) may be present in the elastomeric composition in a total amount from about 1 phr to about 14 phr, more particularly from about 1 phr to about 10 phr, or even more particularly from about 1 phr to about 5 phr (including all values between the stated values or ranges and subranges between such values). At amounts of above 14 phr antimony trioxide flame retardant(s), it is understood that the effect may become saturated and/or reduce abrasion resistance, and at amounts below about 1 phr it is understood that the effect may make flame resistance unsuitable, especially in combination with the halogenated flame retardant(s).

Alternatively or additionally to the above-mentioned halogenated flame retardant(s) and antimony trioxide flame retardant(s), the elastomeric composition may include one or more alumina trihydrate (ATH) compound(s) serving as a flame retardant (also referred to as an alumina trihydrate flame retardant). As used herein, an alumina trihydrate compound (or alumina trihydrate flame retardant) is a compound containing greater than 50 percent by weight of alumina trihydrate based upon total compound weight. In exemplary embodiments, the alumina trihydrate flame retardant(s) contain greater than 70 percent by weight of alumina trihydrate, or even more particularly greater than 90 wt. % alumina trihydrate, such as about 100 wt. % alumina trihydrate. These alumina trihydrate flame retardant(s) have a chemical formula of $Al(OH)_3$ and work by decomposing endothermically, absorbing heat in the process and releasing water in the form of water vapor at a temperature of about 200-220° C. (392-428° F.). The residual aluminum oxide ($Al_2O_3$) that remains after ATH decomposes may form a protective char layer that acts as a physical barrier, helping to prevent further exposure of the underlying material to oxygen and heat.

The alumina trihydrate flame retardant(s) may be present in the elastomeric composition in a total amount from about 2 phr to about 25 phr, more particularly from about 5 phr to about 20 phr, or even more particularly from about 5 phr to about 15 phr (including all values between the stated values or ranges and subranges between such values). At amounts of above 25 phr ATH flame retardant(s), it is understood that the effect may become saturated and/or reduce abrasion resistance, and at amounts below about 2 phr it is understood that the effect may make flame resistance unsuitable. The ATH flame retardant(s) may be a precipitated material having a particle size in a range from about 0.5 micrometers to 10 microns, for example. The smaller particle size increases surface area and thus the reinforcing properties of the material, especially at relatively high amounts (e.g., about 10 phr).

In exemplary embodiments, the elastomeric composition includes all three of the aforementioned flame retardants—halogenated compound(s) (e.g., DecaBDE), antimony trioxide compound(s) (e.g., 90 wt. % $Sb_2O_3$) and alumina trihydrate compound(s) (e.g., 100 wt. % $Al(OH)_3$)—which may be present in a total amount from about 20 phr to about 65 phr, more particularly from about 20 phr to about 50 phr, or even more particularly from about 20 phr to about 40 phr (including all values between the stated values or ranges and subranges between such values). To provide suitable synergies, the total amount of the halogenated compound(s) may be greater than the total amount of the antimony trioxide compounds, such as by about two to ten times as much. The total amount of the halogenated compound(s) also may be greater than the total amount of the alumina trihydrate compound(s), for example about 30% to about 50% greater.

As described in further detail below, in some example(s) it was found that when the three aforementioned flame retardants—halogenated compound(s) (e.g., DecaBDE), antimony trioxide compound(s) (e.g., 90 wt. % $Sb_2O_3$) and alumina trihydrate compound(s) (e.g., 100 wt. % $Al(OH)_3$)—were present in the composition in an amount of greater than 50 phr, for example at about 52 phr (e.g., Comparative Example 1 and 2), then the elastomeric composition exhibited poor abrasion resistance for a conveyor application, for example having a non-rotating abrasion value of 61 $mm^3$, even though the flame resistance was suitable (e.g., afterglow value of 59 seconds and flameout of 4 seconds). On the other hand, in other example(s), reducing the total amount of these three flame retardants to below 50 phr, for example at about 28 phr (e.g., Comparative Example 3), improved abrasion resistance to a suitable level (e.g., 17 $mm^3$) but resulted in poorer fire resistance (e.g., afterglow of 106 seconds). The incorporation of the intumescent graphite(s) was found to break this trade-off between abrasion resistance and fire resistance with these flame retardants, by providing synergistic cooperation with the other flame retardants to simultaneously achieve good flame resistance and abrasion resistance.

The total amount of intumescent graphite(s) incorporated into the elastomeric composition along with the other flame retardant(s) may be from about 1 phr to about 10 phr (including all values between the stated values or ranges and subranges between such values). In exemplary embodiments, the total amount of intumescent graphite(s) may be from about 1 phr to about 5 phr, more particularly in a range from about 2 phr to about 4 phr, without detrimentally impacting abrasion resistance while also significantly boosting flame retardancy. When the intumescent graphite(s) are incorporated in an amount of about 10 phr or greater, it has been found in some examples that physical properties such as tensile are reduced (e.g., Example 10). Likewise, when the intumescent graphite(s) are incorporated in an amount of less than 1 phr, such as zero IG(s), then it has been found that the compound exhibits poorer flame retardancy (e.g., Comparative Example 3). In some example(s) it has been found that incorporating intumescent graphite(s) in an amount of 2 phr or less may not provide very good flame resistance (e.g., 92 second afterglow in Example 1), and in an amount of 5 phr or more may start to negatively impact abrasion resistance and/or the physical properties (e.g., tensile). In the range from about 2 phr to about 5 phr IG(s), the abrasion resistance may be very good (e.g., less than 30 $mm^3$ for Example 8) and afterglow also is very good (e.g., less than 40 seconds for Example 8). In addition, the flame out value also is very good (e.g., less than 40 seconds in Example 8). Within the range of 1 phr to 10 phr, however, it is believed that the intumescent graphite(s) can be incorporated along with the above-mentioned flame retardants in the above-identified amounts to achieve a non-rotating DIN abrasion value of less than 150 $mm^3$ according to DIN 53516, Method A and an afterglow value of less than 100 seconds in accordance with testing under ASTM D378 13.2; optionally with a flame out value of less than 60 seconds in accordance with testing under ASTM D378 13.2.

The intumescent graphite(s) may be of any suitable type within the above-identified range(s). For example, the intumescent graphite(s) may include expandable graphite type(s) (also referred to as expandable flake graphite, intumescent flake graphite, or expandable flake; and, for the purposes herein, these terms may be used interchangeably). Such expandable graphite may include intercalated graphite in which an intercalant material is included between the graphene layers of the graphite crystal or particle. Examples of intercalant materials include halogens, alkali metals, sulfates, nitrates, various organic acids, aluminum chlorides, ferric chlorides, other metal halides, arsenic sulfides, and thallium sulfides. A common intercalant material is sulfuric acid which may be mixed with other oxidizing agents to catalyze the sulfate intercalation to form graphite bisulfate. In exemplary embodiment(s), the intumescent graphite is devoid of halogenated compounds to reduce the overall halogenation level of the elastomeric composition, and in particular is devoid of chlorinated materials to additionally reduce platen press fouling.

In some embodiment(s), the intumescent graphite(s) may have a mean or average nominal particle size in the range from about 30 μm to about 1.5 mm, more particularly from about 50 μm to about 1.0 mm, and even more particularly from about 75 μm to about 350 μm (including all values between the stated values or ranges and subranges between such values). In exemplary embodiment(s), the intumescent graphite may be a coarser grade, for example with a nominal particle size greater than 300 micrometers, which may enable greater expansion ratios and thus provide improved flame resistance properties.

In certain embodiment(s), the intumescent graphite(s) may have a carbon content in a range from about 70 wt. % to about 99 wt. %, more particularly at least 80%, at least 85%, at least 90%, at least 95%, or at least 98%, including all values between the stated values or ranges and subranges between such values. In the case of a sulfur intercalant, such as sulfuric acid, the intumescent graphite may have a sulfur content in a range from about 1 wt. % to about 8 wt. %, more particularly from about 2.5% to about 5.0%, or more particularly from about 3.0% to about 4.0%.

In exemplary embodiment(s), the intumescent graphite(s) may have an expansion ratio (cc/g) in the range from about 10:1 to about 500:1, more particularly from about 20:1 to about 450:1, more particularly from about 30:1 to about 400:1, or even more particularly from about 150:1 to about 350:1, such as about 150:1, 200:1, 250:1, 300:1, and/or 350:1, in which all values between the stated values or ranges and subranges between such values may be provided. In exemplary embodiment(s), the intumescent graphite may have an expansion ratio of 300:1 or greater (e.g., 300:1 to 400:1) which improves flame resistance (e.g. afterglow) while attaining suitable abrasion resistance.

The intumescent graphite(s) (e.g., expandable flake) generally work by heating the material above an activation temperature (e.g., about 150° C. to about 300° C. or about 300° F. to 570° F.) at which point the intercalant compound(s) (e.g., sulfuric acid or other acids) decompose, releasing gases such as sulfur dioxide ($SO_2$), carbon dioxide ($CO_2$), or steam. This gas generation forces the graphite layers to expand dramatically by the expansion ratio, which as noted above may be up to 300 times or more of its original volume. As the graphite expands, it forms a voluminous, carbonaceous char layer that is thermally insulating. This layer generally serves to (i) insulate as a physical barrier, (ii) restrict oxygen access to the surface thereby restricting the combustion process, and (iii) suppress ignition by releasing gases during the expansion which dilutes the concentration of flammable gas.

Although not being limited by theory, it is believed that the incorporation of the intumescent graphite(s) with the other flame retardants—more particularly the halogenated compound(s) (e.g., DecaBDE), antimony trioxide compound(s) (e.g., 90 wt. % $Sb_2O_3$) and alumina trihydrate compound(s) (e.g., 100 wt. % $Al(OH)_3$) which may be present in the above-identified ranges—serves as a highly-effective flame retardant in synergistic cooperation with these other flame retardants, which enables a relatively small amount of the intumescent graphite to be utilized (e.g., less than 10 phr, more particularly less than 5 phr), along with a lesser overall amount of the other flame retardants (e.g., less than 50 phr, more particularly less than 30 phr), which in turn results in improved abrasion resistance along with suitable flame resistance.

Reinforcing Agent(s)

The elastomeric composition also may include one or more reinforcing agents to enhance specific characteristics, such as the mechanical properties of the cured elastomeric compound. Such reinforcing agent(s) may include, for example, one or more carbon black(s), silica(s), calcium carbonate(s) (chalk), clay(s) (kaolin), aluminum silicate(s), calcium silicate(s), magnesium silicate(s) (talc), or other ceramics or minerals, or mixtures thereof.

In exemplary embodiments, the elastomeric composition contains one or more different types of the reinforcing agent(s). The one or more reinforcing agent(s) may be present in the composition in a total amount from about from about 30 phr to about 80 phr; more particularly from about 40 phr to about 60 phr; such as about 30, 40, 50, 60, 70 or 80 phr; and including all values between the stated values or ranges and subranges between such values.

In certain embodiments, the elastomeric composition contains one or more types of carbon black(s) as at least one of the reinforcing agent(s). Typically, carbon blacks use a naming convention as specified by ASTM D1765 to identify the particular type and size of the carbon black. For N-series carbon blacks, grades range from N110 to N990, in which the first numerical digit designates a primary particle size or surface area of the carbon black, and the last two numerical digits designate the structural complexity of the carbon black. A lower first digit (e.g., N100-series) has a smaller primary particle size, and thus higher surface area, than a higher first digit (e.g., N900-series). Unlike virgin carbon black, recovered carbon black (rCB) does not use the same N-number designation system according to ASTM D1765; however, the rCB still may have at least an equivalent mean particle size as N-series designated virgin carbon black, and thus any designation of an N-type carbon black as used herein encompasses both virgin and other types of equivalent carbon black (e.g., rCB) unless specifically stated otherwise.

In exemplary embodiments, the elastomeric composition contains carbon black(s) in a range between N100-series (e.g., $N_2$ surface area from about 121 $m^2/g$ to about 150 $m^2/g$ according to ASTM D3037) and N300-series (e.g., $N_2$ surface area from about 70 $m^2/g$ to about 99 $m^2/g$), for example an N200-series carbon black (e.g., $N_2$ surface area from about 100 $m^2/g$ to about 120 $m^2/g$ according to ASTM D3037), all values between the stated values or ranges and subranges between such values, in which such carbon blacks(s) are present in the above-noted amounts for the reinforcing agent(s)—e.g., in a total amount from about from about 30 phr to about 80 phr (or subranges thereof).

The elastomeric composition may contain one or more additional types of reinforcing agent(s) other than carbon black(s), for example, silica(s). However, it may be advantageous that the elastomeric composition is devoid of any silica and/or contains only carbon black(s) as the only reinforcing agent(s), since the carbon black can improve the electrical conductivity properties of the composition and can control mechanical properties such as tensile strength and abrasion resistance. In addition, the absence of silica may obviate the use of silane coupling agents in the composition.

In exemplary embodiment(s), the elastomeric composition is devoid of other fiber reinforcing agent(s) other than carbon black(s), and optionally silica(s). More particularly, the elastomeric composition may be devoid of dispersed short fibers (e.g., diameters greater than 1 micron), for example, chopped glass fibers, chopped cotton fibers or the like, as these types of materials are not conventionally used in conveyor belt and may not provide a desired performance.

Plasticizer(s)

The elastomeric composition may contain one or more plasticizers to increase flexibility, reduce hardness, and/or improve the processing characteristics of the composition. The plasticizer(s) may be of any suitable type or combination of types and may be in any suitable amount(s) as may be desired for the application. For example, the plasticizer(s) may include mineral oils, paraffinic oils, naphthenic oils, aromatic oils, vegetable oils, epoxidized oils, synthetic polymer plasticizers (e.g., liquid polybutene), ester plasticizers (e.g., esters of polycarboxylic acids such as adipic, phosphoric, phthalic, sebacic and higher aliphatic alcohols or phenols), phthalate plasticizers (e.g., Dibutyl phthalate, di-2-ethylhexyl phthalate), sebacate plasticizers (e.g., di-2-ethylhexyl sebacate), phosphate plasticizers (e.g., tricresyl phosphate), ether plasticizers (e.g., dibenzyl ether, polyethers or polyether-thioethers), or the like, or mixtures thereof.

It has been found, however, that the presence of plasticizer(s), such as plasticizer oil(s), may reduce the abrasion resistance of the cured elastomeric composition. Therefore, in exemplary embodiments, the elastomeric composition is devoid or essentially devoid of any plasticizer(s), such as any or all of the above-identified types of plasticizer(s).

Processing Aid(s)

The elastomeric composition also may include one or more processing aids to improve processing flow, dispersion of fillers, etc. Examples of processing aid(s) may include hydrocarbon (HC) resins (e.g., aliphatic C-5 petroleum hydrocarbon resin), thermoplastic (TP) phenolic resins, fatty acid salts (e.g., metal soaps such as zinc stearate, calcium stearate, or mixtures thereof), fatty acid esters, or the like, or mixtures thereof.

The one or more processing aid(s) may be present in the elastomeric composition in a total amount from about 1 phr to about 10 phr, more particularly from about 1 phr to about 5 phr, such as about 1, 2, 5, 7 or 10 phr. Polymeric forms of the processing aid(s) are not calculated in the formulation as part of the base polymer content forming the matrix—i.e., they do not constitute part of the 100 phr base polymer of the composition.

Antidegradant(s)

The elastomeric composition may contain one or more antidegradant(s), which may include antioxidants and/or antiozonants, to prevent oxidation and/or the damaging effects of ozone, which can cause cracking and deterioration of the composition. Examples of the antidegradant(s) may include, for example, amines (e.g., naphthylamines, diphenyl amine derivatives, paraphenylenediamines such as N-phenyl-N'-(1,3-dimethylbutyl)-p-phenylenediamine (6PPD), N,N'-diphenyl-p-phenylenediamine (DPPD), N,N'-ditolyl-p-phenylenediamine (DTPD), N-isopropyl-N'-phenyl-p-phenylenediamine (IPPD)), quinolines (e.g., dihydroquinolines such as 2,2,4-trimethyl-1,2-dihydroquinoline (TMQ)), thioesters (e.g., bis-(alkylthiopropionate)diesters, alkylthiodipropionate esters), dithiocarbamates (e.g., nickel or zinc salt thereof), 2-Mercaptobenzimidazole (MBI) (including its metal salt (e.g., Zinc 2-mercaptotolumidazole) (ZMTI)), hydrocarbon wax(es) (e.g., paraffin wax, microcrystalline wax), or the like, or mixtures thereof.

The antidegradant(s) may be present in the elastomeric composition in a total amount from about 2 phr to about 15 phr, more particularly from about 5 phr to about 12 phr, more particularly from about 5 phr to about 10 phr, including all values between the stated values or ranges and subranges between such values.

Activator(s)

The elastomeric composition may include one or more activators to help activate the curing system and promote the formation of crosslinks between polymer chains during vulcanization. Any suitable activator(s) or combination of activator(s) in any suitable quantity may be utilized in the elastomeric composition. For example, activator(s) may include zinc oxide, fatty acids or soaps (e.g., stearic acid, lauric acid, etc.), zinc complexes (e.g., zinc soap), or the like, or mixtures thereof.

The activator(s) may be present in the elastomeric composition in a total amount from about 1 phr to about 15 phr, more particularly from about 1 phr to about 10 phr, even more particularly from about 2 phr to about 8 phr, including all values between the stated values or ranges and subranges between such values.

Accelerator(s)

The elastomeric composition also may contain one or more accelerators to accelerate the cure of the composition. The accelerator(s) may include thiazole accelerators, mercapto accelerators (e.g., including 2-Mercaptobenzothiazole such as Benzothiazyl Disulfide (MBTS), Zinc 2-Mercaptobenzothiazole (ZMBT)), sulfenamide accelerators (e.g., N-cyclohexyl-2-benzothiazolesulfenamide (CBS), N,N-dicyclohexylbenzothiazole-2-sulfenamide (DCBS), benzothiazyl-2-sulfenomorpholide (MBS), N-tert-butyl-2-benzothiazylsulfenamide (TBBS)), thiocarbamate accelerators (ZDMC, ZDEC, ZDBC, ZEPC), thiuram accelerators (e.g., tetrabenzylthiuram disulfide (TBzTD), tetramethylthiuram disulfide (TMTD) or tetraethylthiuram disulfide (TETD), thiuram tetrasulfides, for example dipentamethylenethiuram tetrasulfide (DPTT), thiophosphate accelerators, thiourea accelerators, xanthogenate accelerators and/or guanidine accelerators (e.g., diphenylguanidine (DPG), di-o-tolyl guanidine (DOTG)).

The accelerator(s) may be present in the elastomeric composition in a total amount from about 1 phr to about 5 phr.

Retardant(s)

The elastomeric composition also may contain one or more retardant(s) to retard the cure of the composition. The retardant(s) may be present in the elastomeric composition in a total amount from about 0.25 phr to about 1 phr, for example. An example of a suitable retardant may be a phthalimide type, such as N-(Cyclohexylthio) phthalimide (PVI), which may be provided in the above-identified range.

Vulcanizing Agent(s)

The elastomeric composition also contains one or more vulcanizing agent(s) or curative(s) that cross-link the polymer chains in the base polymer(s), making the composition more elastic and less prone to permanent deformation. The vulcanizing agent(s) may include sulfur and/or sulfur donors, or peroxides (e.g., organic peroxides such as dicumyl peroxide, bis-(t-butyl peroxy-diisopropyl benzene, t-butyl perbenzoate, di-t-butyl peroxide, 2,5-dimethyl-2,5-di-t-butylperoxyhexane, alpha-alpha-bis (t-butylperoxy) diisopropylbenzene). It is understood that some of the accelerators listed above may simultaneously be sulfur donors, but they generally are not considered direct substitutes for free sulfur in the context of a vulcanizing agent.

The vulcanizing agent(s) may be present in a total amount from about 1 phr to about 5 phr, more particularly from about 1 phr to about 3 phr. In exemplary embodiments, the vulcanizing agent includes sulfur as the vulcanizing agent, which is provided in the above-identified range(s).

Material Properties

As noted above, the cured compound formed from the exemplary elastomeric composition may have properties that make it particularly suitable for conveyor belt applications, more particularly for the top cover layer of a conveyor belt. More specifically, the inclusion of the intumescent graphite(s) along with the other flame retardant(s) in the amounts identified above has been found to provide a balance between abrasion resistance and flame resistance, resulting in suitable flame resistance criteria such as an afterglow value of less than 100 seconds in accordance with testing under ASTM D378 13.2 (e.g., 0, 1, 5, 10, 20, 30, 40, 50, 55, 60, 70, 80, 90, 100 seconds, including all values between the stated values or ranges and subranges between such values), and a suitable abrasion resistance such as a non-rotating DIN abrasion value of less than 150 $mm^3$ according to DIN 53516, Method A (e.g., 5, 10, 15, 20, 30, 40, 50, 55, 60, 70, 80, 90, 100, 125, 150 $mm^3$, including all values between the stated values or ranges and subranges between such values), as compared against comparative composition(s) having the same basic composition but without the intumescent graphite(s) and with a greater total flame retardant loading. The exemplary elastomeric compound also may achieve a flameout value of less than 60 seconds in accordance with testing under ASTM D378 13.2 (e.g., 0, 1, 5, 10, 20, 30, 40, 50, 60 seconds, including all values between the stated values or ranges and subranges between such values).

The exemplary elastomeric composition with the intumescent graphite(s) along with the other flame retardant(s) in the amounts identified above also may have little to no reduction in original (unaged) tensile strength compared to the comparative composition(s) as tested according to ASTM D412. For example, the exemplary elastomeric composition with the intumescent graphite(s) along with the other flame retardant(s) may have a tensile strength according to ASTM D412 of greater than 1800 psi, more particularly greater than 2000 psi, such as in a range of 1800 psi to 3500 psi, for example.

The exemplary elastomeric composition with the intumescent graphite(s) along with the other flame retardant(s) in the amounts identified above also may have little to no reduction in original modulus at 100% or 300% as compared to the comparative composition(s) as tested according to ASTM D412. For example, the Mod100 values may be greater than about 200 to 300 psi.

The exemplary elastomeric composition with the intumescent graphite(s) along with the other flame retardant(s) in the amounts identified above also may have a hardness of about 55 Shore A to about 65 Shore A.

The exemplary elastomeric composition with the intumescent graphite(s) along with the other flame retardant(s) in the amounts identified above also may have an elongation of about 400 to 700%, for example.

EXAMPLES

Elastomeric compositions were prepared, cured, and tested for the purpose of further illustrating the nature of some of the embodiments and aspects of the present disclosure and are not intended as a limitation on the scope thereof. The test data for these evaluations are shown in Tables 1 through 3. In the test data the evaluations for tensile strength, elongation %, and modulus were conducted according to ASTM D412, and are shown as original (unaged) properties. Hardness testing was conducted according to ASTM D2240. DIN abrasion resistance testing was performed in accordance with ASTM D 5963 (also DIN 53516, Method A for non-rotating; and Method B for rotating). Die C Tear testing was conducted according to ASTM D624 standard. Flame resistance testing including flameout and afterglow were tested under the methods according to ASTM D378 13.2 for the cured elastomeric composition itself, it being noted that ASTM D378 13.2 technically applies to conveyor belt assemblies with top, bottom and reinforcement layers.

Referring to Tables 1-3, various elastomeric formulations for different test samples are shown. This includes comparative examples that do not contain intumescent graphite, and examples according to the present disclosure containing intumescent graphite(s) along with other flame retardant(s), namely halogenated compound(s) (e.g., DecaBDE), antimony trioxide compound(s) (e.g., 90 wt. % $Sb_2O_3$) and alumina trihydrate compound(s) (e.g., 100 wt. % $Al(OH)_3$). Certain examples used a blend of polybutadiene elastomer and polyisoprene rubber (natural or synthetic) constituting 100 phr of the compositions. The carbon black(s) used in the examples were one or more types in the N100-series to N300-series range. The plasticizer(s), processing aid(s), activator(s), antidegradant(s), accelerator(s), retardant(s), etc. were in accordance with the disclosure above. Three types of intumescent graphite were tested, including (i)>300 microns, 300:1 expansion ratio; 98% carbon; (ii)>180 microns, 230:1 expansion ratio; 80% carbon; and (iii)>75 microns, 160:1 expansion ratio; 80% carbon.

TABLE 1

| | units | Ex. 1 | Ex. 2 | Ex. 3 | Ex. 4 |
|---|---|---|---|---|---|
| Ingredient | | | | | |
| Elastomer: BR(s) | phr | 87 | 87 | 87 | 87 |
| Elastomer: IR(s) | phr | 13 | 13 | 13 | 13 |
| Carbon Black(s): N100-N300 | phr | 45 | 45 | 45 | 45 |
| Halogenated flame retardant(s): DecaBDE | phr | 14 | 14 | 14 | 14 |
| Antimony Trioxide flame retardant(s): 90% $Sb_2O_3$ | phr | 3.5 | 3.5 | 3.5 | 3.5 |

TABLE 1-continued

| | units | Ex. 1 | Ex. 2 | Ex. 3 | Ex. 4 |
|---|---|---|---|---|---|
| Alumina Trihydrate flame retardant(s): Precipitated ATH | phr | 10 | 10 | 10 | 10 |
| Intumescent graphite(s): >300 microns, 300:1 expansion ratio; 98% carbon | phr | 2 | — | — | — |
| Intumescent graphite(s): >180 microns, 230:1 expansion ratio; 80% carbon | phr | — | 3 | 5 | — |
| Intumescent graphite(s): >75 microns, 160:1 expansion ratio; 80% carbon | phr | — | — | — | 5 |
| Antidegradant(s) | phr | 9.5 | 9.5 | 9.5 | 9.5 |
| Process Aid(s) | phr | 3.1 | 3.1 | 3.1 | 3.1 |
| Activator(s) | phr | 5 | 5 | 5 | 5 |

TABLE 1-continued

| | units | Ex. 1 | Ex. 2 | Ex. 3 | Ex. 4 |
|---|---|---|---|---|---|
| Vulcanizing Agent: Sulfur | phr | 1 | 1 | 1 | 1 |
| Accelerator(s) | phr | 1 | 1 | 1 | 1 |
| Retarder(s) | phr | 0.15 | 0.15 | 0.15 | 0.15 |
| PHR Running Total: | phr | 194.25 | 195.25 | 197.25 | 197.25 |
| Total Flame Retardant: | phr | 29.5 | 30.5 | 32.5 | 32.5 |
| Orig. Mechanicals | | | | | |
| Tensile | psi | 2266 | 2221 | 2057 | 2308 |
| Elongation | % | 583 | 543 | 534 | 581 |
| Mod 100 | psi | 250 | 261 | 259 | 256 |
| Mod 300 | psi | 856 | 863 | 837 | 820 |
| Hardness | Sh. A | 63 | 64 | 64 | 63 |
| Tear and Abrasion | | | | | |
| DIN Abrasion (non-rotating) | $mm^3$ | 31 | 33 | 39 | 42 |
| Flame Resistance | | | | | |
| Flame out | Sec. | 8 | 1 | 0 | 2 |
| Afterglow | Sec. | 92 | 47 | 29 | 36 |

TABLE 2

| | units | Comp. 1 | Comp. 2 | Ex. 5 | Ex. 6 | Ex. 7 |
|---|---|---|---|---|---|---|
| Ingredient | | | | | | |
| Elastomer: BR(s) | phr | — | — | 87 | — | — |
| Elastomer: IR(s) | phr | 100 | — | 13 | 100 | — |
| Elastomer: SBR | phr | — | 100 | | — | 100 |
| Carbon Black(s): N100-N300 | phr | 45 | 45 | 45 | 45 | 45 |
| Halogenated flame retardant(s): DecaBDE | phr | 6.25 | 6.25 | 14 | 14 | 14 |
| Antimony Trioxide flame retardant(s): 90% $Sb_2O_3$ | phr | 1.5 | 1.5 | 3.5 | 3.5 | 3.5 |
| Alumina Trihydrate flame retardant(s): Precipitated ATH | phr | 10 | 10 | 10 | 10 | 10 |
| Intumescent graphite(s): >300 microns, 300:1 expansion ratio; 98% carbon | phr | 0 | 0 | 3.5 | 3.5 | 3.5 |
| Intumescent graphite(s): >180 microns, 230:1 expansion ratio; 80% carbon | phr | — | — | — | — | — |
| Intumescent graphite(s): >75 microns, 160:1 expansion ratio; 80% carbon | phr | — | — | — | — | — |
| Chlorinated paraffin wax, 70% Cl. (Flame retardant) | phr | 25 | 25 | — | 0 | 0 |
| Chlorinated paraffin liquid, 55% Cl. (Flame retardant) | phr | 5 | 5 | — | — | — |
| Zinc Borate (Flame retardant) | phr | 4.4 | 4.4 | — | — | — |

TABLE 2-continued

| | units | Comp. 1 | Comp. 2 | Ex. 5 | Ex. 6 | Ex. 7 |
|---|---|---|---|---|---|---|
| Antidegradant(s) | phr | 9.5 | 9.5 | 9.5 | 9.5 | 9.5 |
| Process Aid(s) | phr | 3.1 | 3.1 | 3.1 | 3.1 | 3.1 |
| Activator(s) | phr | 5 | 5 | 5 | 5 | 5 |
| Vulcanizing Agent: Sulfur | phr | 1 | 1 | 1 | 1 | 1 |
| Accelerator(s) | phr | 1 | 1 | 1 | 1 | 1 |
| Retarder(s) | phr | 0.15 | 0.15 | 0.15 | 0.15 | 0.15 |
| PHR Running Total: | phr | 216.9 | 216.9 | 195.8 | 195.8 | 195.8 |
| Total Flame Retardant: | phr | 52.1 | 52.1 | 31.0 | 31.0 | 31.0 |
| Orig. Mechanicals | | | | | | |
| Tensile | psi | 2283 | 1579 | 2506 | 3387 | 2269 |
| Elongation | % | 534 | 872 | 571 | 535 | 690 |
| Mod 100 | psi | 251 | 163 | 276 | 317 | 242 |
| Mod 300 | psi | 885 | 377 | 919 | 1451 | 691 |
| Hardness | Sh. A | 59 | 61 | 63 | 63 | 68 |
| Tear and Abrasion | | | | | | |
| DIN Abrasion (non-rotating) | $mm^3$ | 324 | 246 | 33 | 212 | 145 |
| Flame Resistance | | | | | | |
| Flame out | Sec. | 12 | 6 | 6 | 16 | 3 |
| Afterglow | Sec. | 23 | 8 | 58 | 4 | 35 |

TABLE 3

| | unit | Ex. 8 | Ex. 9 | Ex. 10 | Ex. 11 | Ex. 12 | Comp. 4 | Ex. 13 | Ex. 14 |
|---|---|---|---|---|---|---|---|---|---|
| Ingredient | | | | | | | | | |
| Elastomer: BR(s) | phr | 87 | 87 | 87 | 87 | 87 | 87 | 87 | 87 |
| Elastomer: IR(s) | phr | 13 | 13 | 13 | 13 | 13 | 13 | 13 | 13 |
| Carbon Black(s): N100-N300 | phr | 45 | 45 | 45 | 45 | 45 | 45 | 45 | 45 |
| Halogenated flame retardant(s): DecaBDE | phr | 14 | 14 | 14 | 14 | 25 | 14 | 10 | 25 |
| Antimony Trioxide flame retardant(s): 90% $Sb_2O_3$ | phr | 3.5 | 3.5 | 3.5 | 14 | 3.5 | 3.5 | 2 | 3.5 |
| Alumina Trihydrate flame retardant(s): Precipitated ATH | phr | 10 | 25 | 10 | 10 | 10 | 10 | 6 | 25 |
| Intumescent graphite(s): >300 microns, 300:1 expansion ratio; 98% carbon | phr | 3.5 | 3.5 | 10 | 3.5 | 3.5 | 0 | 2 | 10 |
| Intumescent graphite(s): >180 microns, 230:1 expansion ratio; 80% carbon | phr | — | — | — | — | — | — | — | — |
| Intumescent graphite(s): >75 microns, 160:1 expansion ratio; 80% carbon | phr | — | — | — | — | — | — | — | — |
| Antidegradant(s) | phr | 9.5 | 9.5 | 9.5 | 9.5 | 9.5 | 9.5 | 9.5 | 9.5 |
| Process Aid(s) | phr | 4.1 | 4.1 | 4.1 | 4.1 | 4.1 | 4.1 | 4.1 | 4.1 |
| Activator(s) | phr | 5 | 5 | 5 | 5 | 5 | 5 | 5 | 5 |

TABLE 3-continued

| | unit | Ex. 8 | Ex. 9 | Ex. 10 | Ex. 11 | Ex. 12 | Comp. 4 | Ex. 13 | Ex. 14 |
|---|---|---|---|---|---|---|---|---|---|
| Vulcanizing Agent: Sulfur | phr | 1 | 1 | 1 | 1 | 1 | 1 | 1 | 1 |
| Accelerator(s) | phr | 1 | 1 | 1 | 1 | 1 | 1 | 1 | 1 |
| Retarder(s) | phr | 0.2 | 0.2 | 0.2 | 0.2 | 0.2 | 0.2 | 0.2 | 0.2 |
| PHR Running Total: | phr | 196.8 | 211.8 | 203.3 | 207.3 | 207.8 | 193.3 | 185.8 | 229.3 |
| Total flame retardant: | phr | 31.0 | 46.0 | 37.5 | 41.5 | 42.0 | 27.5 | 20.0 | 63.5 |
| Orig. Mechanicals | | | | | | | | | |
| Tensile | psi | 2133 | 2116 | 1969 | 2078 | 2173 | 2462 | 2233 | 1961 |
| Elongation | % | 529 | 519 | 500 | 579 | 563 | 603 | 596 | 490 |
| Mod 100 | psi | 262 | 293 | 293 | 241 | 245 | 241 | 223 | 305 |
| Mod 300 | psi | 892 | 943 | 926 | 759 | 827 | 838 | 785 | 938 |
| Hardness | Sh. A | 61 | 64 | 65 | 60 | 63 | 61 | 60 | 66 |
| Tear and Abrasion | | | | | | | | | |
| DIN Abrasion (non-rotating) | $mm^3$ | 24 | 42 | 30 | 32 | 28 | 17 | 12 | 49 |
| Flame Resistance | | | | | | | | | |
| Flame out | Sec. | 38 | 57 | 5 | 0 | 0 | 39 | 58 | 0 |
| Afterglow | Sec. | 38 | 2 | 4 | 130 | 35 | 106 | 68 | 0 |

As shown in Table 1, the results of such testing demonstrate that Example 1 with a lower IG content (2 PHR) had relatively poor flameout (e.g., compared to Example 8). Example 2 with medium IG particle size at 3 PHR also had relatively poor flameout. Example 3 increases medium IG particle size to 5 PHR and had better flame out, but worse abrasion. Example 4 with the smallest particle size IG has better flame out, but worse than medium particle size (Example 3), and worse abrasion.

As shown in Table 2, Comparative Examples 1 and 2 use different elastomer bases and a flame package without IG and instead the flame package includes chlorinated paraffin wax, chlorinated paraffin liquid and zinc borate (about 52 phr total flame retardant along with halogenated compound(s), antimony trioxide compound(s) and alumina trihydrate compound(s)). The results of these Comparative Examples show poor abrasion resistance using such a flame package as compared against the Example flame packages using IG. For example, Example 6 with an IR/NR base elastomer and 3.5 phr IG in combination with halogenated compound(s), antimony trioxide compound(s) and alumina trihydrate compound(s) (about 31 phr total flame retardant) improves abrasion resistance and maintains flame performance as compared against Comparative Example 1 with IR/NR base; and Example 7 with an SBR base elastomer and same flame package as Example 6 improves abrasion resistance and maintains flame performance as compared against SBR based Comparative Example 2, thus demonstrating the improved balance provided by the exemplary flame package. Example 5 changes the base elastomer to a mixture of BR and IR/NR which further improves abrasion resistance as compared to both the IR/NR (Example 6) and SBR (Example 7) elastomers.

As shown in Table 3, Example 8 provides very good performance in both flame resistance (especially afterglow) and abrasion resistance, using 31 total phr flame package with IG. Example 9 raises the ATH content from 10 phr to 25 phr which improves afterglow, but sacrifices some abrasion resistance. Example 10 increases IG to 10 phr, which improves afterglow and flame out but with worse abrasion resistance (e.g., compared to Example 8). Example 11 increases the $Sb_2O_3$ content from 3.5 phr to 14 phr, which results in worse abrasion resistance and worse after glow as compared to Example 8. Example 12 raises the halogenated compound(s) content from 14 phr to 25 phr, resulting in better flame out with minimal impact on abrasion resistance. Comparative Example 3 without IG but with lower overall flame package (27.5 phr) has poorer afterglow and flame out but with better abrasion resistance as compared to Example 8. Example 13 includes IG at 2 phr and further reduces the total flame package to 20 phr total, resulting in poorer flame out and better abrasion resistance. Example 14 includes IG at 10 phr and further increases the total flame package to 63.5 phr total, resulting in worse abrasion resistance and very good flame out performance.

In summary, the experimental data demonstrates that the flame retardant package in a total amount from 20 phr to 65 phr including (i) halogenated compound(s) in a total amount from 5 phr to 25 phr, (ii) antimony trioxide compound(s) in a total amount from 1 phr to 15 phr, (iii) alumina trihydrate compound(s) in a total amount from 2 phr to 25 phr, and (iv) intumescent graphite(s) in a total amount from 1 phr to 10 phr, cooperate in synergistic effect to provide at least i) an afterglow value of less than 100 seconds (more particularly 60 seconds or less; more particularly 40 seconds or less) in accordance with testing under ASTM D378 13.2 as associated with flame resistance; and (ii) a non-rotating DIN abrasion value of less than 150 $mm^3$ (more particularly 100 $mm^3$ or less; more particularly 50 $mm^3$ or less) according to DIN 53516, Method A as associated with abrasion resistance. For example, such synergy is demonstrated in the data by (1) examples with a relatively high total phr flame package without IG showing comparatively good flame resistance and poor abrasion resistance (e.g., Comparative Examples 1 and 2), (2) examples with a relatively low total phr flame package without IG having poor flame resistance and good abrasion resistance (e.g., Comparative Example 3), and (3) the exemplary flame package including IG (e.g., Example 8) having a balance of good flame resistance and good abrasion resistance, thus breaking the inherent tradeoff between flame resistance and abrasion resistance and demonstrating synergy. In other words, the data suggests that the incorporation of the intumescent graphite(s) with the other flame retardants, namely the halogenated compound(s), antimony trioxide compound(s), and alumina trihydrate compound(s)—in the above-identified ranges—serves as a highly-effective flame retardant in synergistic cooperation with these other flame retardants, which enables a relatively small amount of the intumescent graphite to be utilized, along with a lesser overall amount of the other flame retardants, which in turn results in improved abrasion resistance along with suitable flame resistance.

Exemplary article(s) and/or elastomeric composition(s) have been described herein, more particularly in which the article may be a conveyor belt or cover layer of a conveyor belt including an elastomeric composition containing a unique flame-retardant system that includes intumescent graphite along with other flame retardant(s) that cooperate in synergist effect to achieve certain flame resistance criteria while also providing suitable abrasion resistance, for example attaining an afterglow value of less than 100 seconds according to ASTM D378 13.2 as associated with flame resistance, and attaining a non-rotating DIN abrasion value of less than 150 $mm^3$ according to DIN 53516, Method A as associated with abrasion resistance.

According to an aspect, a conveyor belt includes: a top cover layer, a bottom cover layer, and a reinforcement layer between the top and bottom cover layers, wherein at least the top cover layer includes a cured elastomeric compound formed from a composition including: one or more base elastomer(s); one or more reinforcing agent(s) in a total amount from 30 phr to 80 phr; flame retardants in a total amount from 20 phr to 65 phr; wherein the flame retardants include: one or more halogenated compound(s) in a total amount from 5 phr to 25 phr; one or more antimony trioxide compound(s) in a total amount from 1 phr to 15 phr; one or more alumina trihydrate compound(s) in a total amount from 2 phr to 25 phr; and one or more intumescent graphite(s) in a total amount from 1 phr to 10 phr; wherein the flame retardants cooperate in synergistic effect such that: (i) the cured elastomeric compound has an afterglow value of less than 100 seconds in accordance with testing under ASTM D378 13.2 as associated with flame resistance; and (ii) the cured elastomeric compound has a non-rotating DIN abrasion value from 5 $mm^3$ to 150 $mm^3$ according to DIN 53516, Method A as associated with abrasion resistance.

According to another aspect, a method of improving a conveyor belt, includes: (i) providing a top cover layer, a bottom cover layer, and a reinforcement layer between the top and bottom cover layers to form the conveyor belt, wherein at least the top cover layer includes a cured elastomeric compound formed from a composition comprising: one or more base elastomer(s) and one or more reinforcing agent(s) in a total amount from 30 phr to 80 phr; (ii) improving a combination of both abrasion resistance and flame resistance of the cured elastomeric compound by incorporating a flame-retardant system into the composition, in which the flame-retardant system includes flame retardants in a total amount from 20 phr to 65 phr; wherein the flame retardants include: one or more halogenated compound(s) in a total amount from 5 phr to 25 phr; one or more antimony trioxide compound(s) in a total amount from 1 phr to 15 phr; one or more alumina trihydrate compound(s) in a total amount from 2 phr to 25 phr; and one or more intumescent graphite(s) in a total amount from 1 phr to 10 phr; wherein the improving the combination of both the abrasion resistance and the flame resistance is provided by the flame retardants cooperating in synergistic effect such that: (i) the cured elastomeric compound has an afterglow value of less than 100 seconds in accordance with testing under ASTM D378 13.2 as associated with flame resistance; and (ii) the cured elastomeric compound has a non-rotating DIN abrasion value from 5 $mm^3$ to 150 $mm^3$ according to DIN 53516, Method A as associated with abrasion resistance.

According to another aspect, a conveyor belt includes: a top cover layer, a bottom cover layer, and a reinforcement layer between the top and bottom cover layers, wherein at least the top cover layer includes a cured elastomeric compound formed from a composition including: one or more base elastomer(s), the one or more base elastomers including a mixture of (i) one or more polybutadiene elastomers and (ii) one or more polyisoprene elastomer(s), wherein the base elastomers altogether constitute at least 90 phr of the base elastomers of the elastomeric composition, the one or more polybutadiene elastomers being present in an amount of at least 80 phr and the one or more polyisoprene elastomer(s) being present in an amount of at least 10 phr; one or more reinforcing agent(s) in a total amount from 30 phr to 80 phr, the one or more reinforcing agent(s) consisting of only carbon black(s) which is/are present in total amount from 30 phr to 80 phr; a single flame-retardant system consisting of a plurality of flame retardants present in a total amount from 20 phr to 45 phr, wherein the plurality of flame retardants consist of: one or more halogenated compound(s) in a total amount from 10 phr to 20 phr, the one or more halogenated compound(s) including decabromodiphenyl ethane(s); one or more antimony trioxide compound(s) in a total amount from 1 phr to 5 phr, the one or more antimony trioxide compound(s) having at least 90% $Sb_2O_3$; one or more alumina trihydrate compound(s) in a total amount from 5 phr to 15 phr, the one or more alumina trihydrate compound(s) consisting essentially of 100% alumina trihydrate; and one or more intumescent graphite(s) in a total amount from 3 phr to 5 phr, the one or more intumescent graphite(s) having an expansion ratio in a range from 250:1 to 350:1, and having an average particle size in a range from 200 microns to 400 microns; wherein the flame retardants cooperate in synergistic effect such that: (i) the cured elastomeric compound has an afterglow value of 40 seconds or less in accordance with testing under ASTM D378 13.2 as associated with flame resistance; and (ii) the cured elastomeric compound has a non-rotating DIN abrasion value from 10 $mm^3$ to 30 $mm^3$ according to DIN 53516, Method A as associated with abrasion resistance.

According to another aspect, an article comprising a cured elastomeric body formed from a composition includes: one or more base elastomer(s); one or more reinforcing agent(s); and a single flame-retardant system consisting of a plurality of flame retardants present in a total amount from 20 phr to 65 phr, wherein the flame-retardant system includes intumescent graphite in a total amount from 1 phr to 10 phr; wherein the cured elastomeric body has an afterglow value of less than 100 seconds according to ASTM D378 13.2 as associated with flame resistance; and wherein the cured elastomeric body has a non-rotating DIN abrasion value of less than 150 $mm^3$ according to DIN 53516, Method A as associated with abrasion resistance.

Exemplary embodiment(s) may include one or more of the following additional features combined with any of the foregoing or following aspects, in which one or more of these additional features may be combined separately or in any suitable combination with each other.

In exemplary embodiment(s), the one or more base elastomers include a mixture of (i) one or more polybutadiene elastomers and (ii) one or more polyisoprene elastomer(s), wherein the base elastomers altogether constitute at least 90 phr of the base elastomers of the elastomeric composition.

In exemplary embodiment(s), the cured elastomeric compound has an afterglow value of less than 60 seconds in accordance with testing under ASTM D378 13.2 as associated with flame resistance.

In exemplary embodiment(s), the cured elastomeric compound has a non-rotating DIN abrasion value from 10 $mm^3$ to 50 $mm^3$ according to DIN 53516, Method A as associated with abrasion resistance.

In exemplary embodiment(s), the flame retardants are present in a total amount from 20 phr to 45 phr.

In exemplary embodiment(s), the one or more halogenated compound(s) are present in a total amount from 10 phr to 20 phr.

In exemplary embodiment(s), the one or more antimony trioxide compound(s) are present in a total amount from 1 phr to 5 phr.

In exemplary embodiment(s), the one or more alumina trihydrate compound(s) are present in a total amount from 5 phr to 15 phr.

In exemplary embodiment(s), the one or more intumescent graphite(s) are present in a total amount from 3 phr to 10 phr.

In exemplary embodiment(s), the cured elastomeric compound has an afterglow value of 40 seconds or less in accordance with testing under ASTM D378 13.2 as associated with flame resistance.

In exemplary embodiment(s), the cured elastomeric compound has a non-rotating DIN abrasion value from 10 $mm^3$ to 50 $mm^3$ according to DIN 53516, Method A as associated with abrasion resistance.

In exemplary embodiment(s), the one or more intumescent graphite(s) are present in a total amount from 3 phr to 5 phr.

In exemplary embodiment(s), the cured elastomeric compound has a non-rotating DIN abrasion value from 10 $mm^3$ to 30 $mm^3$ according to DIN 53516, Method A as associated with abrasion resistance.

In exemplary embodiment(s), the one or more polybutadiene elastomers are present in an amount of at least 80 phr and the one or more polyisoprene elastomer(s) are present in an amount of at least 10 phr.

In exemplary embodiment(s), the one or more reinforcing agent(s) consist of only one or more carbon black(s), more particularly which may be present in total amount from 30 phr to 80 phr.

In exemplary embodiment(s), the one or more halogenated compound(s) includes decabromodiphenyl ethane(s).

In exemplary embodiment(s), the one or more antimony trioxide compound(s) have at least 90% $Sb_2O_3$.

In exemplary embodiment(s), the one or more alumina trihydrate compound(s) consist essentially of 100% alumina trihydrate.

In exemplary embodiment(s), the one or more intumescent graphite(s) have an expansion ratio in a range from 250:1 to 350:1.

In exemplary embodiment(s), the one or more intumescent graphite(s) have an average particle size in a range from 200 microns to 400 microns.

In exemplary embodiment(s), the flame retardants form a flame-retardant system which is the only flame retardant system in the composition, the flame-retardant system consisting essentially of the one or more halogenated compound(s), the one or more antimony trioxide compound(s), the one or more alumina trihydrate compound(s), and the one or more intumescent graphite(s); more particularly which are present in a total amount from 20 phr to 45 phr.

In exemplary embodiment(s), the composition is devoid of styrene butadiene elastomer (SBR), ethylene propylene diene monomer (EPDM) elastomer, ethylene vinyl acetate elastomer (EVM), nitrile butadiene elastomer (NBR), and/or chlorinated polyethylene (CPE).

The foregoing description of the embodiments has been provided for purposes of illustration and description. Example embodiments are provided so that this disclosure will be sufficiently thorough, and will convey the scope to those who are skilled in the art. Numerous specific details are set forth such as examples of specific components, devices, and methods, to provide a thorough understanding of embodiments of the disclosure, but are not intended to be exhaustive or to limit the disclosure. It will be appreciated that it is within the scope of the disclosure that individual elements or features of a particular embodiment are generally not limited to that particular embodiment, but, where applicable, are interchangeable and can be used in a selected embodiment, even if not specifically shown or described. Thus, while a particular feature may have been described with respect to only one or more of several embodiments, such feature may be combined with one or more other features of the other embodiments, separately or in any combination. The same may also be varied in many ways. Such variations are not to be regarded as a departure from the disclosure, and all such modifications are intended to be included within the scope of the disclosure. as may be desired and advantageous for any given or particular application.

Any background information contained in this disclosure is to facilitate a better understanding of the various aspects described herein. It should be understood that any such background statements are to be read in this light, and not as admissions of prior art. Likewise, the description and examples are presented herein solely for the purpose of illustrating the various embodiments of the disclosure and should not be construed as a limitation to the scope and applicability of the disclosure.

Transitional language such as “including,” “comprising,” “having,” “containing,” “involving,” or variations thereof, is intended to be broad and encompass the subject matter listed thereafter, equivalents, and additional subject matter not recited, i.e., to be open-ended and meaning including but not limited to.

Use of “a” or “an” are employed in this disclosure to describe elements and components of the embodiments herein. This is done merely for convenience and to give a general sense of concepts according to the disclosure. This description should be read to include one or at least one and the singular also includes the plural unless otherwise stated.

The phrase “and/or” as used in this disclosure should be understood to mean “either or both” of the elements so conjoined, i.e., elements that are conjunctively present in some cases and disjunctively present in other cases. Other elements may optionally be present other than the elements specifically identified by the “and/or” clause, whether related or unrelated to those elements specifically identified unless clearly indicated to the contrary. Thus, as a non-limiting example, a reference to “A and/or B,” when used in conjunction with open-ended language such as “comprising” can refer, in one embodiment, to A without B (optionally including elements other than B); in another embodiment, to B without A (optionally including elements other than A); in yet another embodiment, to both A and B (optionally including other elements); etc.

The phrases "at least one of [A], [B] and [C];" "at least one of [A], [B] or [C];" "one or more of [A], [B] and [C]"; or "one or more of [A], [B] or [C]" are all synonymous with the phrase "and/or" and are used to mean "one, or more, or all" unless clearly indicated to the contrary. Thus, as a non-limiting example, this could mean (1) A only, (2) B only, (3) C only, (4) A and B, (5) A and C, (6) B and C, or (7) all of A, B and C. Other elements may optionally be present other than the elements specifically identified whether related or unrelated to those elements specifically identified unless clearly indicated to the contrary—e.g., by reciting a closed group of alternatives, such as via conventional "Markush grouping" by stating "selected from the group consisting of [A], [B], and [C]."

The word "or" as used in this disclosure should be understood as being inclusive and not exclusive. For example, when separating items in a list, "or" or "and/or" shall be interpreted as being inclusive, i.e., the inclusion of at least one, but also including more than one, of a number or list of elements, and, optionally, additional unlisted items. For example, a condition A or B is satisfied by anyone of the following: A is true (or present) and B is false (or not present), A is false (or not present) and B is true (or present), and both A and B are true (or present). Only terms clearly indicating exclusivity should be interpreted as indicating exclusive alternatives (i.e. "one or the other but not both"), such as "either," "only one of," or "exactly one of." In other words, such terms of exclusivity refer to the inclusion of exactly one element of a number or list of elements.

Any references to "one embodiment" or "an embodiment" as used herein is understood to mean that a particular element, feature, structure, or characteristic described in connection with the embodiment is included in at least one embodiment. The appearances of the phrase "in one embodiment" in various places in the specification are not necessarily referring to the same embodiment.

The word "exemplary" is used herein to mean "serving as an example or illustration." Any aspect or design described herein as "exemplary" is not necessarily to be construed as preferred or advantageous over other aspects or designs. Likewise, the phrases "particularly," "preferably," or the like as used in this disclosure may refer to an element or value that provides advantage(s) in some embodiment(s), however is not intended to limit the scope of the disclosure to those "particular" or "preferable" features.

The example(s), if any, are for the purpose of illustrating the nature of some of the embodiment(s) and/or aspect(s) of the present disclosure and are not intended as a limitation on the scope thereof. Along these lines, such example(s) may include exemplary ingredients according to certain embodiment(s) of the present disclosure, and also may specifically exclude certain other ingredient(s) according to certain embodiment(s) of the present disclosure. Therefore, it is to be understood that the listing of certain ingredient(s) or class(es) of ingredients in the disclosure which are absent in the example(s) of the disclosure can mean an express exclusion of such ingredient(s) or class(es) of ingredients as if explicitly stated such that the inventor(s) have possession of such exclusion(s). It is understood, of course, that the absence of ingredient(s) according to certain embodiment(s) illustrated in the example(s) is not a limitation on all embodiment(s) of the disclosure, and so some embodiment(s) may include the absent ingredient(s), unless clearly indicated to the contrary.

It is to be understood that all values, ranges, ratios or the like as described in this disclosure may be combined in any manner. In addition, it is to be understood that a concentration or amount or value range listed in this disclosure is intended to include any and every concentration or amount or value within the range, including the end points, as if each value within the range has been expressly stated, and thus these values are incorporated herein by reference. For example, "a range of from 1 to 10" is to be read as indicating each and every possible number along the continuum between about 1 and about 10. Thus, even if specific data points within the range, or even no data points within the range, are explicitly identified or refer to only a few specific data points, it is to be understood that the inventor(s) appreciate and understand that any and all data points within the range are to be considered to have been specified, and that inventor(s) have possession of the entire range and all points within the range.

In addition, each numerical value used in this disclosure should be read once as modified by the term "about" (unless already expressly so modified), and then read again as not so modified unless otherwise indicated in context. The term "about" as used herein refers to any value which lies within the range defined by a variation of up to ±10% of the stated value, for example, ±10%, ±9%, ±8%, ±7%, ±6%, ±5%, ±4%, ±3%, ±2%, ±1%, ±0.01%, or ±0.0% of the stated value, as well as values intervening such stated values. When the term "about" is used in describing a value or an end-point of a range, the disclosure should be understood to include the specific value or end-point referred to.

The term "consisting essentially of" in relation to a composition is to indicate that substantially (e.g., greater than 95 weight % or greater than 99 weight %) of the component(s) present in the composition is the component(s) recited. Therefore, this term does not exclude the presence of minor additives or impurities as would be understood by those having ordinary skill in the art.

It is to be understood that terms such as "top," "bottom," "left," "right," "front," "rear," or the like may refer to an arbitrary frame of reference, rather than to the ordinary gravitational frame of reference. Likewise, spatially relative terms, such as "inner", "adjacent", "outer," "beneath," "below," "lower," "above," "upper," or the like, may be used herein for ease of description to describe one element or feature's relationship to another element(s) or feature(s) as illustrated in the figures. Spatially relative terms may be intended to encompass different orientations of the article in use or operation in addition to the orientation depicted in the figures. For example, if the article in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Terms such as first, second, third, etc. may be used herein to describe various elements, components, regions, layers and/or sections, in which it is understood that these elements, components, regions, layers and/or sections should not be limited by these terms unless stated otherwise. In addition, terms such as "first," "second," and other numerical terms when used herein do not imply a sequence or order unless clearly indicated by the context. Thus, a first element, component, region, layer or section discussed herein could be termed a second element, component, region, layer or section without departing from the teachings of this disclosure.

Although the invention has been shown and described with respect to a certain embodiment or embodiments, it is apparent that equivalent alterations and modifications will occur to those having ordinary skill in the art upon the reading and understanding this disclosure, and such modifications are intended to be included within the scope of this disclosure as defined in the claims. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the disclosure.

LIST OF REFERENCE NUMERALS (PART OF THE SPECIFICATION)

100, 200 Conveyor belt
102 Top cover layer
104 Bottom cover layer
106, 206 Reinforcement layer
108 Reinforcing cords
110 Elastomeric body
208 Textile reinforcement
212 Skim layer
214 Skim layer

What is claimed is:

1. A conveyor belt comprising:
a top cover layer,
a bottom cover layer, and
a reinforcement layer between the top and bottom cover layers,
wherein at least the top cover layer includes a cured elastomeric compound formed from a composition comprising:
one or more base elastomer(s);
one or more reinforcing agent(s) in a total amount from 30 phr to 80 phr;
flame retardants in a total amount from 20 phr to 65 phr;
wherein the flame retardants include:
one or more halogenated compound(s) in a total amount from 5 phr to 25 phr;
one or more antimony trioxide compound(s) in a total amount from 1 phr to 15 phr;
one or more alumina trihydrate compound(s) in a total amount from 2 phr to 25 phr; and
one or more intumescent graphite(s) in a total amount from 1 phr to 10 phr;
wherein the flame retardants cooperate in synergistic effect such that:
(i) the cured elastomeric compound has an afterglow value of less than 100 seconds in accordance with testing under ASTM D378 13.2 as associated with flame resistance; and
(ii) the cured elastomeric compound has a non-rotating DIN abrasion value from 5 $mm^3$ to 150 $mm^3$ according to DIN 53516, Method A as associated with abrasion resistance.

2. The conveyor belt according to claim 1, wherein:
the one or more base elastomers include a mixture of (i) one or more polybutadiene elastomers and (ii) one or more polyisoprene elastomer(s), wherein the base elastomers altogether constitute at least 90 phr of the base elastomers of the elastomeric composition;
the cured elastomeric compound has an afterglow value of less than 60 seconds in accordance with testing under ASTM D378 13.2 as associated with flame resistance; and
the cured elastomeric compound has a non-rotating DIN abrasion value from 10 $mm^3$ to 50 $mm^3$ according to DIN 53516, Method A as associated with abrasion resistance.

3. The conveyor belt according to claim 1, wherein:
the one or more base elastomers include a mixture of (i) one or more polybutadiene elastomers and (ii) one or more polyisoprene elastomer(s), wherein the base elastomers altogether constitute at least 90 phr of the base elastomers of the elastomeric composition;
the flame retardants are present in a total amount from 20 phr to 45 phr;
the one or more halogenated compound(s) are present in a total amount from 10 phr to 20 phr;
the one or more antimony trioxide compound(s) are present in a total amount from 1 phr to 5 phr;
the one or more alumina trihydrate compound(s) are present in a total amount from 5 phr to 15 phr;
the one or more intumescent graphite(s) are present in a total amount from 3 phr to 10 phr;
the cured elastomeric compound has an afterglow value of 40 seconds or less in accordance with testing under ASTM D378 13.2 as associated with flame resistance; and
the cured elastomeric compound has a non-rotating DIN abrasion value from 10 $mm^3$ to 50 $mm^3$ according to DIN 53516, Method A as associated with abrasion resistance.

4. The conveyor belt according to claim 3, wherein:
the one or more intumescent graphite(s) are present in a total amount from 3 phr to 5 phr; and
the cured elastomeric compound has a non-rotating DIN abrasion value from 10 $mm^3$ to 30 $mm^3$ according to DIN 53516, Method A as associated with abrasion resistance.

5. The conveyor belt according to claim 4, wherein:
the one or more polybutadiene elastomers are present in an amount of at least 80 phr and the one or more polyisoprene elastomer(s) are present in an amount of at least 10 phr.

6. The conveyor belt according to claim 5, wherein:
the one or more reinforcing agent(s) consist of only one or more carbon black(s) which is/are present in total amount from 30 phr to 80 phr.

7. The conveyor belt according to claim 1, wherein:
the one or more halogenated compound(s) includes decabromodiphenyl ethane(s).

8. The conveyor belt according to claim 1, wherein:
the one or more antimony trioxide compound(s) have at least 90% $Sb_2O_3$.

9. The conveyor belt according to claim 1, wherein:
the one or more alumina trihydrate compound(s) consist essentially of 100% alumina trihydrate.

10. The conveyor belt according to claim 1, wherein: the one or more intumescent graphite(s) have an expansion ratio in a range from 250:1 to 350:1.

11. The conveyor belt according to claim 10, wherein: the one or more intumescent graphite(s) have an average particle size in a range from 200 microns to 400 microns.

12. The conveyor belt according to claim 1, wherein: the flame retardants form a flame-retardant system which is the only flame retardant system in the composition, the flame-retardant system consisting essentially of the one or more halogenated compound(s), the one or more antimony trioxide compound(s), the one or more alumina trihydrate compound(s), and the one or more intumescent graphite(s), which are present in a total amount from 20 phr to 45 phr.

13. The conveyor belt according to claim 1, wherein: the composition is devoid of styrene butadiene elastomer (SBR), ethylene propylene diene monomer (EPDM) elastomer, ethylene vinyl acetate elastomer (EVM), nitrile butadiene elastomer (NBR), and chlorinated polyethylene (CPE).

14. A method of improving a conveyor belt, comprising:

providing a top cover layer, a bottom cover layer, and a reinforcement layer between the top and bottom cover layers to form the conveyor belt, wherein at least the top cover layer includes a cured elastomeric compound formed from a composition comprising: one or more base elastomer(s) and one or more reinforcing agent(s) in a total amount from 30 phr to 80 phr;

improving a combination of both abrasion resistance and flame resistance of the cured elastomeric compound by incorporating a flame-retardant system into the composition, in which the flame-retardant system includes flame retardants in a total amount from 20 phr to 65 phr;

wherein the flame retardants include:

one or more halogenated compound(s) in a total amount from 5 phr to 25 phr;

one or more antimony trioxide compound(s) in a total amount from 1 phr to 15 phr;

one or more alumina trihydrate compound(s) in a total amount from 2 phr to 25 phr; and one or more intumescent graphite(s) in a total amount from 1 phr to 10 phr;

wherein the improving the combination of both the abrasion resistance and the flame resistance is provided by the flame retardants cooperating in synergistic effect such that: (i) the cured elastomeric compound has an afterglow value of less than 100 seconds in accordance with testing under ASTM D378 13.2 as associated with flame resistance; and (ii) the cured elastomeric compound has a non-rotating DIN abrasion value from 5 $mm^3$ to 150 $mm^3$ according to DIN 53516, Method A as associated with abrasion resistance.

15. A conveyor belt comprising:

a top cover layer, a bottom cover layer, and a reinforcement layer between the top and bottom cover layers, wherein at least the top cover layer includes a cured elastomeric compound formed from a composition comprising:

one or more base elastomer(s), the one or more base elastomers including a mixture of (i) one or more polybutadiene elastomers and (ii) one or more polyisoprene elastomer(s), wherein the base elastomers altogether constitute at least 90 phr of the base elastomers of the elastomeric composition, the one or more polybutadiene elastomers being present in an amount of at least 80 phr and the one or more polyisoprene elastomer(s) being present in an amount of at least 10 phr;

one or more reinforcing agent(s) in a total amount from 30 phr to 80 phr, the one or more reinforcing agent(s) consisting of only carbon black(s) which is/are present in total amount from 30 phr to 80 phr;

a single flame-retardant system consisting of a plurality of flame retardants present in a total amount from 20 phr to 45 phr, wherein the plurality of flame retardants consist of:

one or more halogenated compound(s) in a total amount from 10 phr to 20 phr, the one or more halogenated compound(s) including decabromodiphenyl ethane(s);

one or more antimony trioxide compound(s) in a total amount from 1 phr to 5 phr, the one or more antimony trioxide compound(s) having at least 90% $Sb_2O_3$;

one or more alumina trihydrate compound(s) in a total amount from 5 phr to 15 phr, the one or more alumina trihydrate compound(s) consisting essentially of 100% alumina trihydrate; and one or more intumescent graphite(s) in a total amount from 3 phr to 5 phr, the one or more intumescent graphite(s) having an expansion ratio in a range from 250:1 to 350:1, and having an average particle size in a range from 200 microns to 400 microns;

wherein the flame retardants cooperate in synergistic effect such that:

(i) the cured elastomeric compound has an afterglow value of 40 seconds or less in accordance with testing under ASTM D378 13.2 as associated with flame resistance; and (ii) the cured elastomeric compound has a non-rotating DIN abrasion value from 10 $mm^3$ to 30 $mm^3$ according to DIN 53516, Method A as associated with abrasion resistance.

* * * * *